United States Patent
Meyer

(10) Patent No.: US 9,788,031 B2
(45) Date of Patent: Oct. 10, 2017

(54) SYSTEMS AND METHODS FOR MIXING MODELS TO OPTIMIZE MEDIA PLACEMENT

(71) Applicant: Rovi Guides, Inc., Santa Clara, CA (US)

(72) Inventor: Samuel M. Meyer, Boston, MA (US)

(73) Assignee: Rovi Guides, Inc., San Carlos, CA (US)

(*) Notice: Subject to any disclaimer, the term of this patent is extended or adjusted under 35 U.S.C. 154(b) by 0 days.

(21) Appl. No.: 14/943,365

(22) Filed: Nov. 17, 2015

(65) Prior Publication Data

US 2016/0373792 A1    Dec. 22, 2016

Related U.S. Application Data

(60) Provisional application No. 62/180,934, filed on Jun. 17, 2015.

(51) Int. Cl.

| | |
|---|---|
| *H04N 21/25* | (2011.01) |
| *H04N 21/81* | (2011.01) |
| *H04N 21/2668* | (2011.01) |
| *H04N 21/262* | (2011.01) |
| *H04N 21/258* | (2011.01) |

(Continued)

(52) U.S. Cl.
CPC ....... *H04N 21/251* (2013.01); *G06Q 30/0242* (2013.01); *H04N 21/2407* (2013.01); *H04N 21/252* (2013.01); *H04N 21/25833* (2013.01); *H04N 21/25883* (2013.01); *H04N 21/25891* (2013.01); *H04N 21/2668* (2013.01); *H04N 21/26233* (2013.01); *H04N 21/26283* (2013.01); *H04N 21/4663* (2013.01); *H04N 21/4667* (2013.01); *H04N 21/812* (2013.01)

(58) Field of Classification Search
CPC ........... H04N 21/251; H04N 21/25833; H04N 21/25883; H04N 21/26233; H04N 21/26283; H04N 21/2668; H04N 21/812; H04N 21/2407; H04N 21/252; H04N 21/25891; H04N 21/4663; H04N 21/4667; G06Q 30/0242
See application file for complete search history.

(56) References Cited

U.S. PATENT DOCUMENTS

| | | |
|---|---|---|
| 6,239,794 B1 | 5/2001 | Yuen et al. |
| 6,388,714 B1 | 5/2002 | Schein et al. |

(Continued)

OTHER PUBLICATIONS

Anonymous "Rovi Ad Optimizer" URL: https://web.archive.org/web/20150315021854/http:www.rovicorp.com/products-and-solutions/products/analytics/ad-optimers.htm, Mar. 15, 2015 pp. 1-3.

*Primary Examiner* — Omar S Parra
(74) *Attorney, Agent, or Firm* — Haley Guiliano LLP

(57) ABSTRACT

Methods and systems are disclosed for using multiple reach optimization models together. These models may be used by an optimization system that helps an advertisement campaign manager decide how advertisements should be allocated between different media assets. In some embodiments, the models may be run simultaneously while their results and compared, and execution of some models may be ended based on the comparisons. In some embodiments, models may be combined together to create new models. In some embodiments, results from a first model may used as input in a second model running concurrently. In some embodiments, results from a previous execution of a model may be used to warm-start a subsequent execution of the model.

20 Claims, 14 Drawing Sheets

(51) Int. Cl.
*H04N 21/24* (2011.01)
*H04N 21/466* (2011.01)
*G06Q 30/02* (2012.01)

(56) References Cited

U.S. PATENT DOCUMENTS

| | | |
|---|---|---|
| 6,564,378 B1 | 5/2003 | Satterfield et al. |
| 6,756,997 B1 | 6/2004 | Ward, III et al. |
| 7,165,098 B1 | 1/2007 | Boyer et al. |
| 7,761,892 B2 | 7/2010 | Ellis et al. |
| 7,949,565 B1 | 5/2011 | Eldering et al. |
| 8,046,801 B2 | 10/2011 | Ellis et al. |
| 2002/0174430 A1 | 11/2002 | Ellis et al. |
| 2003/0110499 A1 | 6/2003 | Knudson et al. |
| 2005/0251827 A1 | 11/2005 | Ellis et al. |
| 2010/0153885 A1 | 6/2010 | Yates |
| 2014/0049685 A1 | 2/2014 | Chen |
| 2014/0058785 A1 | 2/2014 | Aronowich et al. |
| 2014/0279781 A1 | 9/2014 | Ling et al. |
| 2014/0289017 A1 | 9/2014 | Trenkle et al. |
| 2015/0037013 A1 | 2/2015 | Thomas et al. |
| 2016/0165277 A1 | 6/2016 | Kirillov et al. |

SYSTEMS AND METHODS FOR MIXING MODELS TO OPTIMIZE MEDIA PLACEMENT

CROSS-REFERENCE TO RELATED APPLICATION

This disclosure claims the benefit under 35 U.S.C. §119 (e) of U.S. Provisional Application No. 62/180,934, filed Jun. 17, 2015, currently pending, which is hereby incorporated by reference herein in its entirety.

BACKGROUND

Advertisement managers make decisions about where to place advertisements based on the number of people they expect to reach with the placement. Advertisement managers often use optimization models to estimate the number of people they will reach with different combinations of placements. Different optimization models may be associated with different results and different computational complexity. It may be determined which optimization model is best suited for any situation. It may also be difficult to run several optimization models simultaneously due to the computation resources required to do so.

SUMMARY

Systems and methods are disclosed herein for mixing models to optimize media placement. In some aspects, the method may include receiving a user input of a plurality of combinations of decision variables, wherein each of the plurality of combinations is associated with a potential media placement slot. For example, an optimization system may receive user input from an advertisement campaign manager of decision inputs describing advertisement slots on channel 4 between 7:00 pm and 9:00 pm.

In some embodiments, the method may include retrieving a first and a second subset of the plurality of combinations of decision variables. For example, the optimization system may retrieve a first subset of advertisement slots between 7:00 pm and 8:00 pm on channel 4 and a second subset of advertisement slots between 8:00 pm and 9:00 pm on channel 4.

In some embodiments, the method may include applying the retrieved first subset to a first linear model that represents a first relationship between the plurality of combinations and associated reach metrics to generate a first reach metric associated with the first subset. In some embodiments, the method may include applying the retrieved second subset to a second non-linear model that represents a second relationship between the plurality of combinations and associated reach metrics to generate a second reach metric associated with the second subset. For example, the optimization system may apply the first model to the first subset to calculate an impressions range of 3500-4500 and the second model to the second subset to calculate an impressions range of 2800-3000.

In some embodiments, the method may include comparing the first reach metric and the second reach metric. For example, the optimization system may compare the first range of 3500-4500 and the second range of 2800-3000. In some embodiments, the method may include determining, based on the comparison, that the first reach metric is greater than the second reach metric. For example, the optimization system may determine that the range of 3500-4000 is greater than the range of 2800-3000.

In some embodiments, the method may include storing, in a media placement database, an identifier of a media asset in a media placement slot associated with the plurality of combinations of decision variables in the first subset. For example, the optimization system may purchase advertisement slots on channel 4 between 7 pm and 8 pm, and store an identifier of a media asset to be used as the advertisement in the purchased media placement slots.

In some embodiments, applying a subset to a model may include executing the model. For example, the optimization system may apply the first model to the first subset by executing equations and instructions associated the first model using control circuitry. The control circuitry may use the first subset as input values for the model being executed.

In some embodiments, the method may comprise applying the first and second subset to the first and second model for a threshold amount of time. For example, the optimization system may execute both models for one minute. In some embodiments, the first and second linear models may be combined. For example, the optimization system may use the first model for a first partition of the plurality of combinations and the second model for a second partition of the plurality of combinations. In some embodiments, the method may comprise using an output from one model as an input for another model. For example, the optimization system may tweak the second model using output from the first model. In some embodiments, comparing the reach metrics may comprise comparing an upper bound of one reach metric to a lower bound of another reach metric.

In some embodiments, the method may include storing an association between the plurality of combinations input by the user and the first model. In some embodiments, the method may include determining that a second input is similar to a first user input, and modifying the first linear model based on the first reach metric to warm-start the first linear model.

In some embodiments, the first and second reach metrics may be a range, a unique range value, or an impressions value. In some embodiments, the method may comprise determining a unique reach value using an impressions value. In some embodiments, the method may comprise generating for display the plurality of combinations of decision variables in the first subset, wherein the plurality of combinations of decision variables include times, lengths of media assets, times elapsed in media assets, audience demographics, and user equipment.

BRIEF DESCRIPTION OF THE FIGURES

The above and other objects and advantages of the disclosure will be apparent upon consideration of the following detailed description, taken in conjunction with the accompanying drawings, in which life reference characters refer to like parts throughout, and in which.

DETAILED DESCRIPTION

Figure 1:
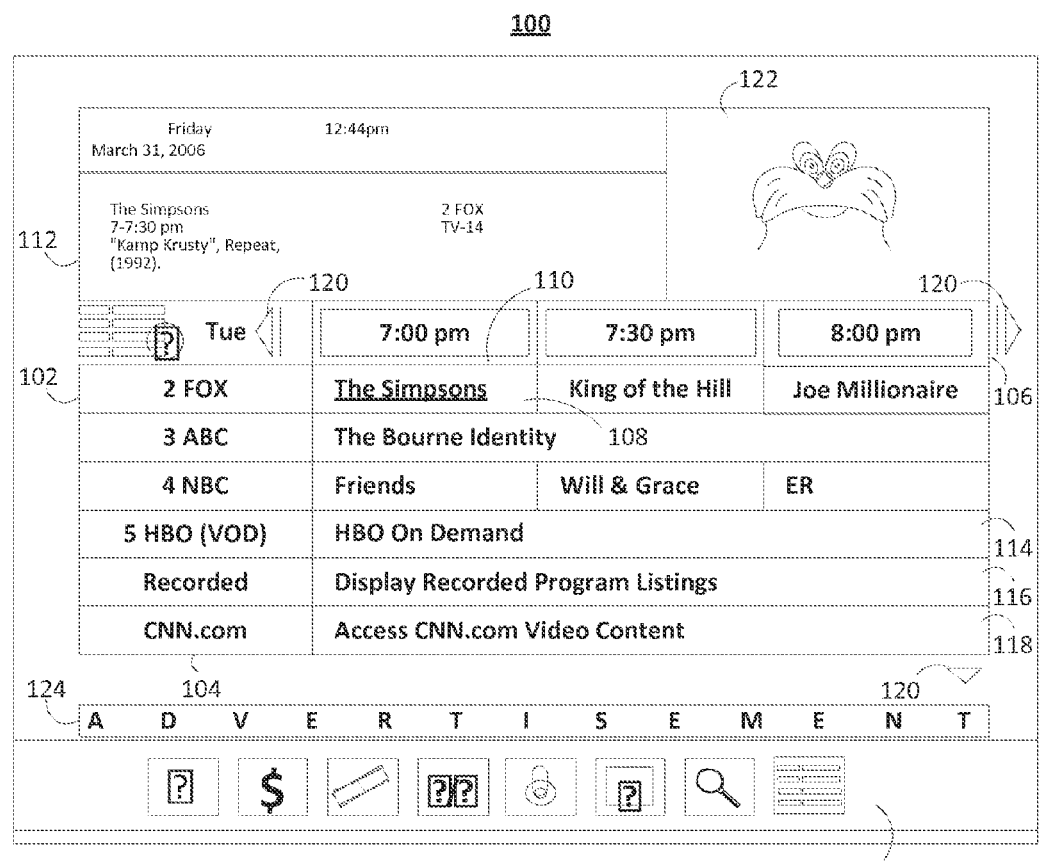
FIG. 1 shows an illustrative example of a display screen generated by a media guidance application in accordance with some embodiments of the disclosure.

The disclosure is directed to methods and systems for using multiple reach optimization models together. These models may be used by an optimization system that helps an advertisement campaign manager decide how advertisements should be allocated between different media assets. In some embodiments, the models may be run simultaneously while their results are compared, and execution of some models may be ended based on the comparisons. In some embodiments, models may be combined together to create new models. In some embodiments, results from a first model may used as input in a second model running concurrently. In some embodiments, results from a previous execution of a model may be used to warm-start a subsequent execution of the model.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application. An application that allows advertisement campaign managers to place advertisements based on their preferences is called an optimization system. In some embodiments, the optimization system may place advertisements in an interactive media guidance application, or in media assets accessed through an interactive media guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
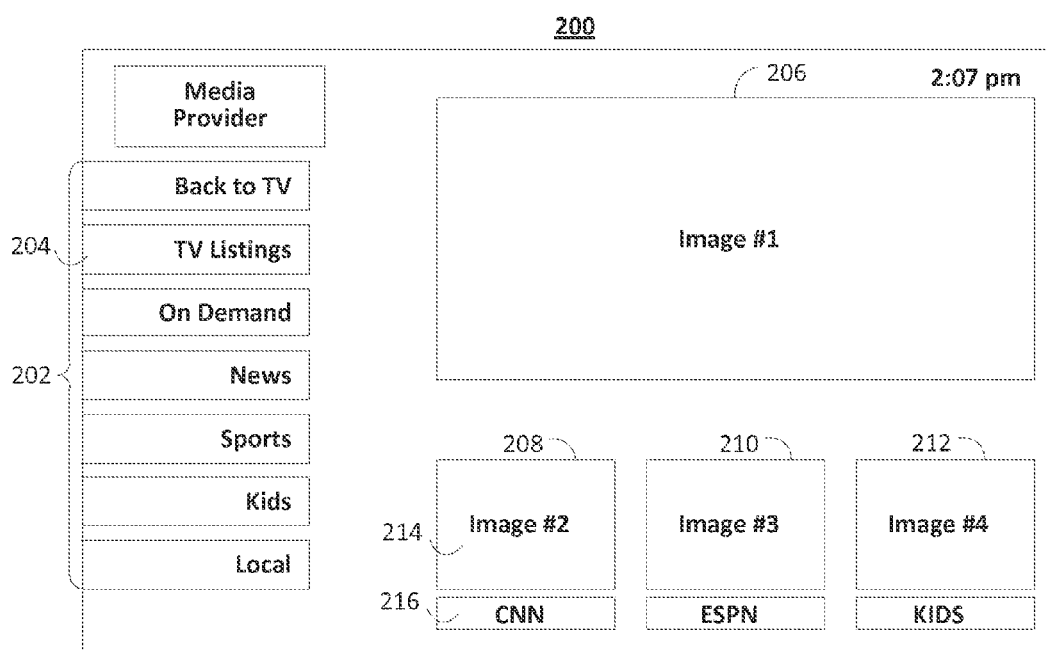
FIG. 2 shows another illustrative example of a display screen generated by a media guidance application in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 3:
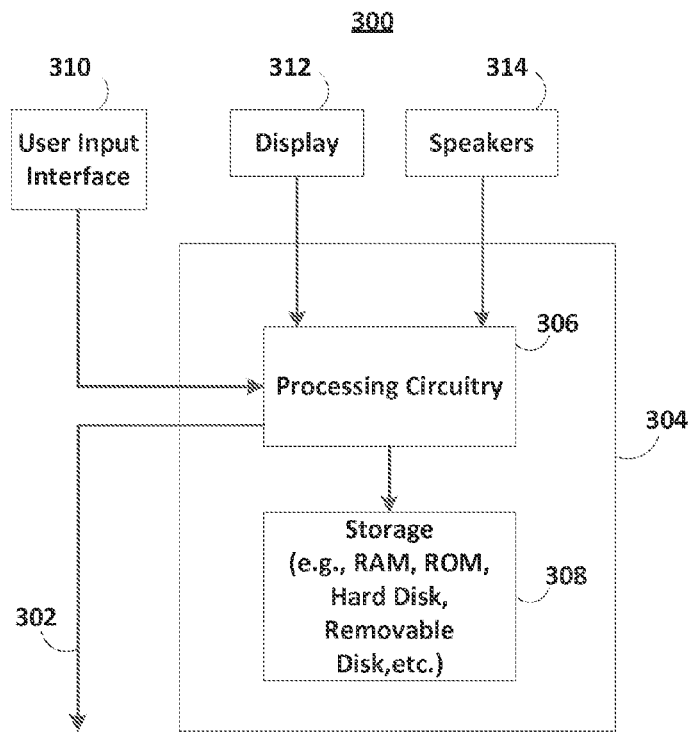
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. The optimization system may be an example of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
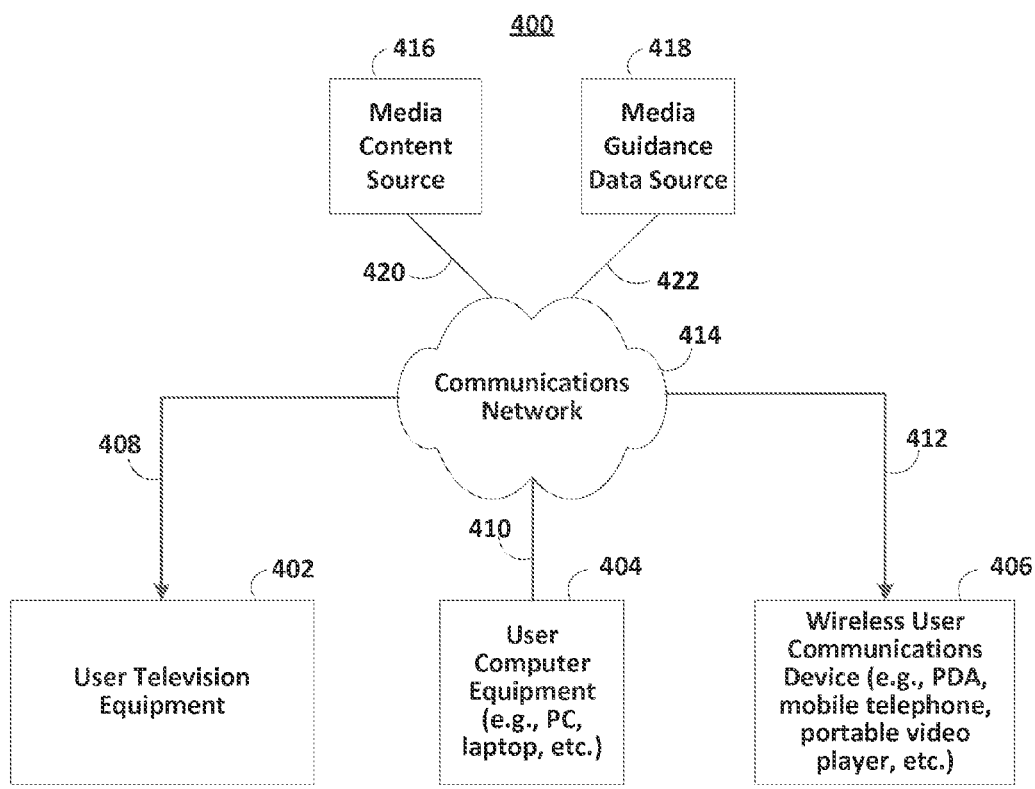
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

As referred herein, the term "in response to" refers to initiated as a result of. For example, a first action being performed in response to another action may include interstitial steps between the first action and the second action. As referred herein, the term "directly in response to" refers to caused by. For example, a first action being performed directly in response to another action may not include interstitial steps between the first action and the second action.

As referred to herein, "advertisement manager" refers to a user of the optimization system. An advertisement manager may be a person, a group of people, or a computer program. An advertisement manager may use the optimization system to determine placement slots for advertisements.

As referred to herein, "decision variables" are variables that define different advertisement slots. Decision variables may include targeted demographics (e.g., females under 30 or retired males), times (e.g., primetime, 2:00 pm-3:00 pm), locations (e.g., New York City, Massachusetts), mediums (e.g., television program, on-demand movie), lengths of advertisements (e.g., 30 seconds, two minutes), and other such variables. An advertisement manager may combine decision variables in any combination to define advertisement slots of interest. For example, an advertisement manager may indicate, using user input interface 310, that the advertisement manager is interested in advertisement slots that are 30 seconds long, and targeted at females under 30 living in New York City who watch primetime television programs. A combination of decision variables may describe any number of advertisement slots.

Figure 5:
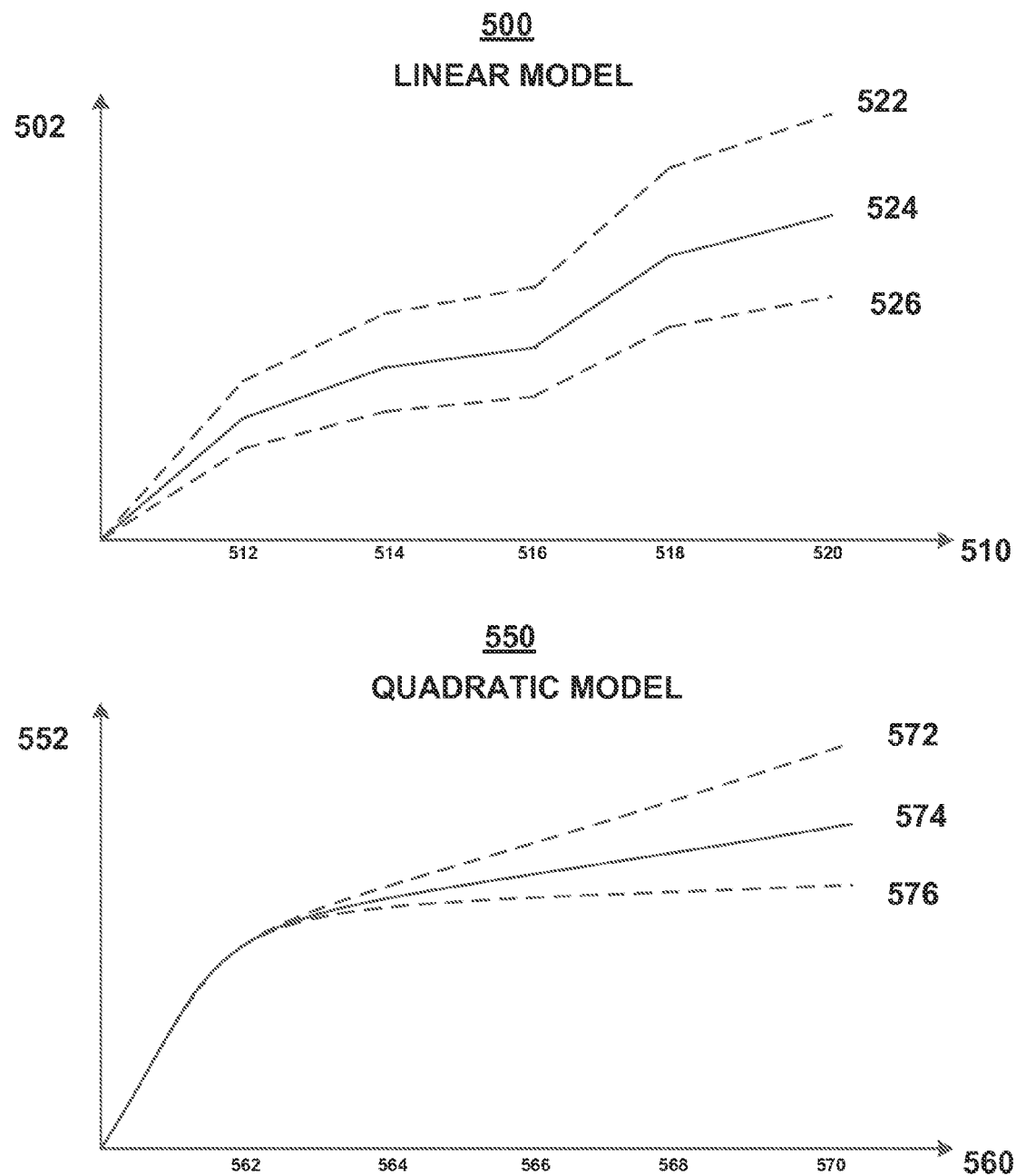
FIG. 5 shows two exemplary models for determining reach values associated with different combinations of decision variables in accordance with some embodiments of the disclosure.

FIG. 5 shows two exemplary models for determining reach values associated with different combinations of decision variables. Model 500 is a linear model, and model 550 is a non-linear quadratic model. Non-linear models may include other types of models as well, such as cubic models or polynomial models. The optimization system may execute models 500 and 550, as well as other types of models, simultaneously.

Models 500 and 550 include x-axes 510 and 560 that represent different combinations of decision variables. For example, x-axis 510 includes points 512, 514, 516, 518, and 520 that each represent advertisement slots defined by a different combination of decision variables. Point 512 may represent advertisement slots in a television program on channel 5 from 6:00 pm to 6:30 pm. Point 514 may represent advertisement slots in a television program on channel 5 from 6:30 pm to 7:00 pm. Point 516 may represent advertisement slots in a television program on channel 6 from 6:00 pm to 6:30 pm. Point 518 may represent advertisement slots in a television program on channel 6 from 6:30 pm to 7:00 pm. Point 520 may represent advertisement slots in a television program on channel 7 from 6:00 pm to 7:00 pm. The optimization system may have received input from the advertisement manager using user input interface 310 indicating an interest in decision variables including channels watched by females under 30 between 6:00 pm and 7:00 pm. The optimization system may have created points 512, 514, 516, 518, and 520 by analyzing the user input, determining which channels fulfill the demographic criteria, and creating different combinations of the decision variables entered by the user based on the determined channels.

X-axis 560 includes points 562, 564, 566, 568, and 570. Points on x-axis 560 may have been created in a manner similar to points on x-axis 510. Points on x-axis 560 may represent the same combinations of decision variables as points on x-axis 560. X-axes 510 and 560 may include any number of points representing any combination of decision variables. Points on x-axes 510 and 560 may represent combinations of decision variables that may or may not represent overlapping advertisement slots.

Y-axes 502 and 552 represent one or more reach metrics. As referred to herein, "reach metrics" include impressions and reach values, as well as upper and lower bounds associated with each of these values. In some embodiments, y-axes 502 and 552 represent impressions. As referred to herein, "impressions" describes the number of viewers reached by an advertisement. In some embodiments, y-axes 502 and 552 represent reach. As referred to herein, "reach" describes the number of unique viewers reached by an advertisement.

Model 500 may include curve 524. Curve 524 may be created by using a linear relationship that takes as input different combinations of decision variables and produces as an output an estimated impressions value. Curve 524 at point 512 may represent the estimated impressions value if advertisements are placed in the advertisement slots represented by the combination of decision variables described by point 512. Curve 524 at point 514 may represent the estimated impressions value if advertisements are placed in the advertisement slots represented by the combination of decision variables described by point 512 and point 514. Model 500 may include upper and lower bounds to represent uncertainty in the model. The upper and lower bounds may be created using the same linear relationship as used to create curve 524, or a different linear relationship. Curve 526 may represent a lower bound of impressions values and curve 522 may represent an upper bound of impressions values.

The optimization system may periodically calculate a reach value from impressions values created by model 500. The frequency of the calculation may be determined by the computational complexity of the calculation. For example, if the optimization system takes 10 seconds to perform a reach calculation from impressions values, and model 500 has a total execution time of 60 seconds, then the optimization system may perform the reach calculation six times or less during the total execution time. In another example, if the optimization system takes 20 seconds to perform a reach calculation from impressions values, and model 500 has a total execution time of 60 seconds, then the optimization system may perform the reach calculation three times or less during the total execution time.

Model 550 may be similar to model 500. Curves 572, 574, and 576 may be created using one or more quadratic relationships. Curve 572 may represent an upper bound while curve 576 may represent a lower bound. In some embodiments, model 550 may be more computationally complex than model 500. The optimization system may determine that model 550 requires more resources such as memory, processing power, or bandwidth than model 500.

The optimization system may compare the results of model 500 and model 550 to determine whether the execution of either of the models should be ended. In some embodiments, the optimization system may compare the impressions values estimated by model 500 to the impressions values estimated by model 550. In some embodiments, the optimization system may compare the reach value periodically computed for model 500 to the reach value periodically computed for model 550. In some embodiments, if model 550 estimates reach values instead of impressions values, the optimization system may compare the reach value periodically computed for model 500 to the reach values estimated by model 550. In some embodiments, the optimization system may compare the upper and lower bounds of one model to the upper and lower bounds of the other model.

In some embodiments, the optimization system may determine that upper bound 572 of model 550 is lower than lower bound 526 of model 500 at a current execution time, and hence end execution of model 550. In some embodiments, the optimization system may determine that the trend produced by curve 574 of model 550 will be lower than curve 524 of model 500 at the end of the execution period, and hence end execution of model 550. In some embodiments, the optimization system may determine that curve 574 of model 550 closely resembles curve 524 of model 500, but model 550 is much more computationally complex than model 500, and hence end execution of model 550. In some embodiments, the optimization system may reallocate the processing power used by model 550 to model 500.

Figure 6:
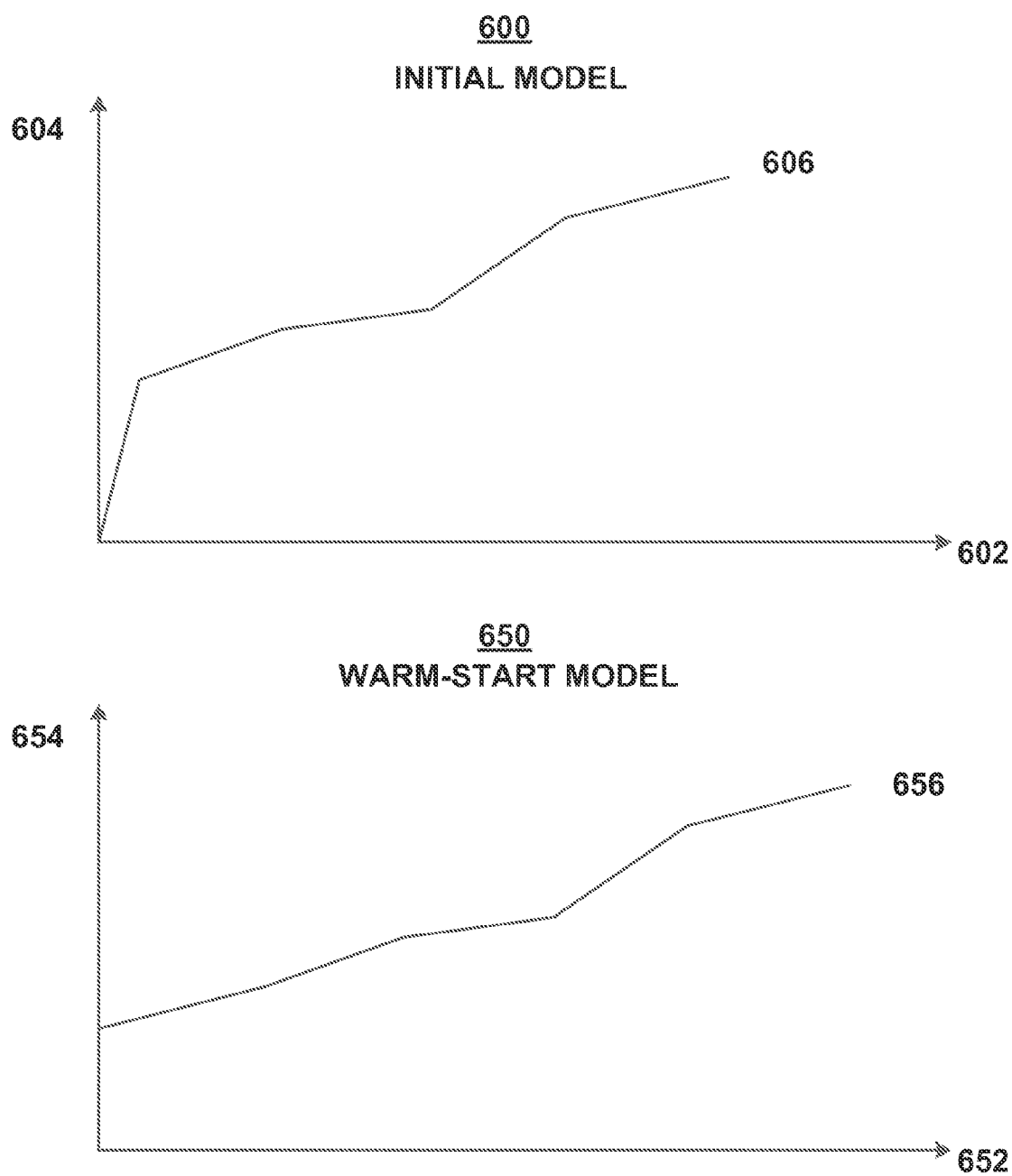
FIG. 6 shows two executions of the same model to illustrate a warm-start model in accordance with some embodiments of the disclosure.

FIG. 6 shows two executions of the same model to illustrate a warm-start model. As referred to herein, a "warm-start model" refers to a model that uses information from a previous execution to start the current execution. Execution 600 shows an initial execution of the model, while execution 650 shows a later execution of the model. The model may be any type of model, for example, model 500 or model 550 as discussed above. X-axes 602 and 652 represent different combinations of reach metrics as discussed above. Y-axes 604 and 654 represent reach metrics as discussed above. Curves 606 and 656 represent outputs of the models. For simplicity, upper bounds and lower bounds are not shown in FIG. 6.

Execution 600 may be an initial execution of a model. The optimization system may analyze curve 606 to determine that curve 606 increases sharply in the beginning, and much more slowly after the initial sharp increase. Execution 650 may be a later execution of the same model. Execution 650 may use the same or different decision variables as execution 600. The optimization system may use the information from execution 600 to provide a warm-start and eliminate the sharp rise from the beginning of execution 650. Hence, optimization system may allow execution 650 to provide more accurate results than execution 600.

Figure 7:
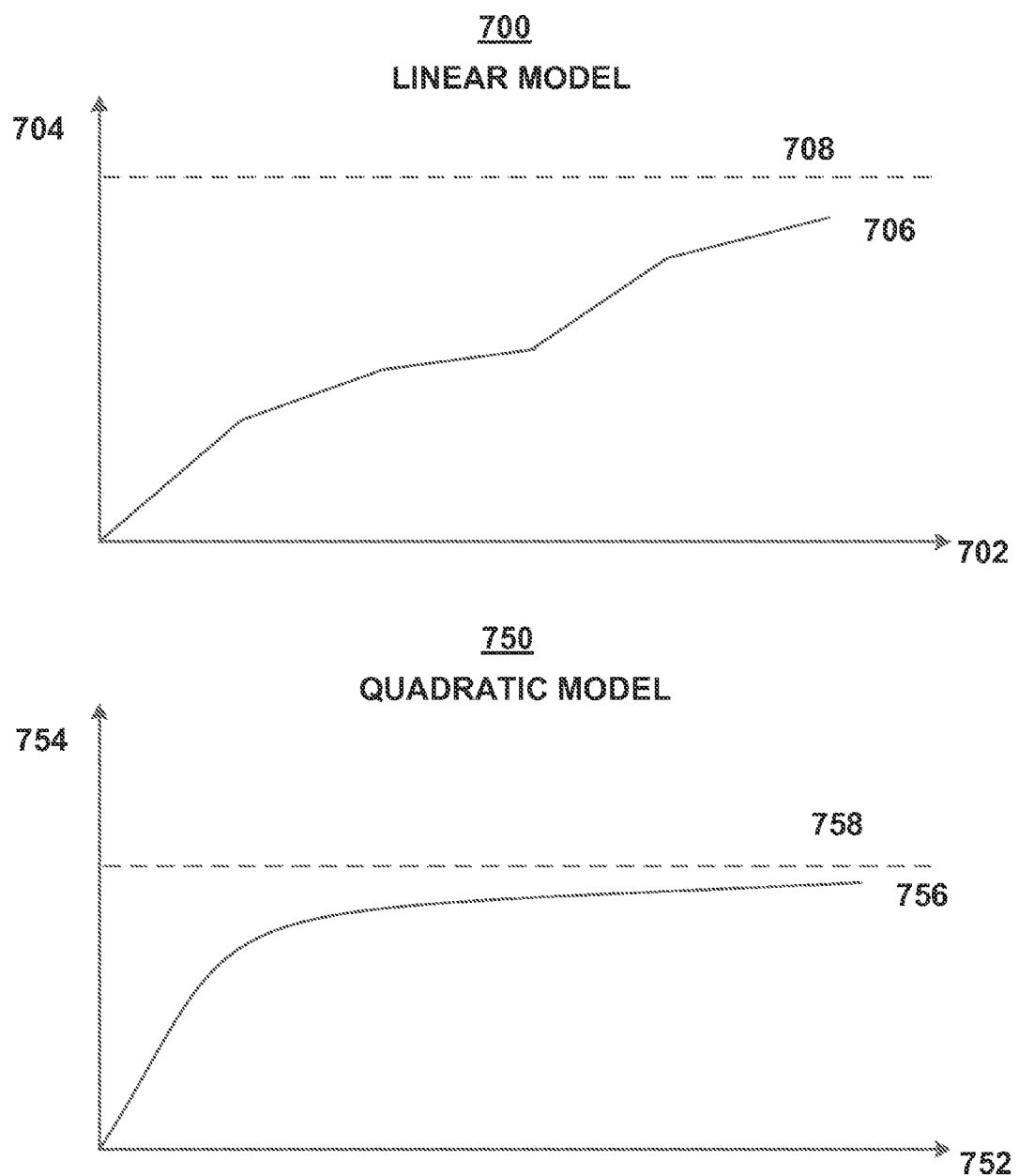
FIG. 7 shows two models approaching output limits in accordance with some embodiments of the disclosure.

FIG. 7 shows two models approaching output limits. Model 700 may be a linear model as described in relation to model 500. Model 750 may be a quadratic model as described in relation to model 550. X-axes 702 and 752 may represent different combinations of decision variables. Y-axes 704 and 754 may represent reach metrics. Curves 706 and 756 represent outputs of the models. For simplicity, upper bounds and lower bounds are not shown in FIG. 7. As referred to herein, "limit" refers to a value on the y-axis that a curve approaches but does not reach.

The optimization system may analyze model 700 to determine model 700 has a limit 708. The optimization system may also analyze model 750 to determine model 750 has a limit 758. In some embodiments, the optimization system may determine that limit 758 is lower than or equal to limit 708 and hence end execution of model 750. In some embodiments, the optimization system may determine that difference between limits 708 and 758 is less than a threshold difference, and that model 750 is more computationally complex than model 700, and hence end execution of model 750.

Figure 8:
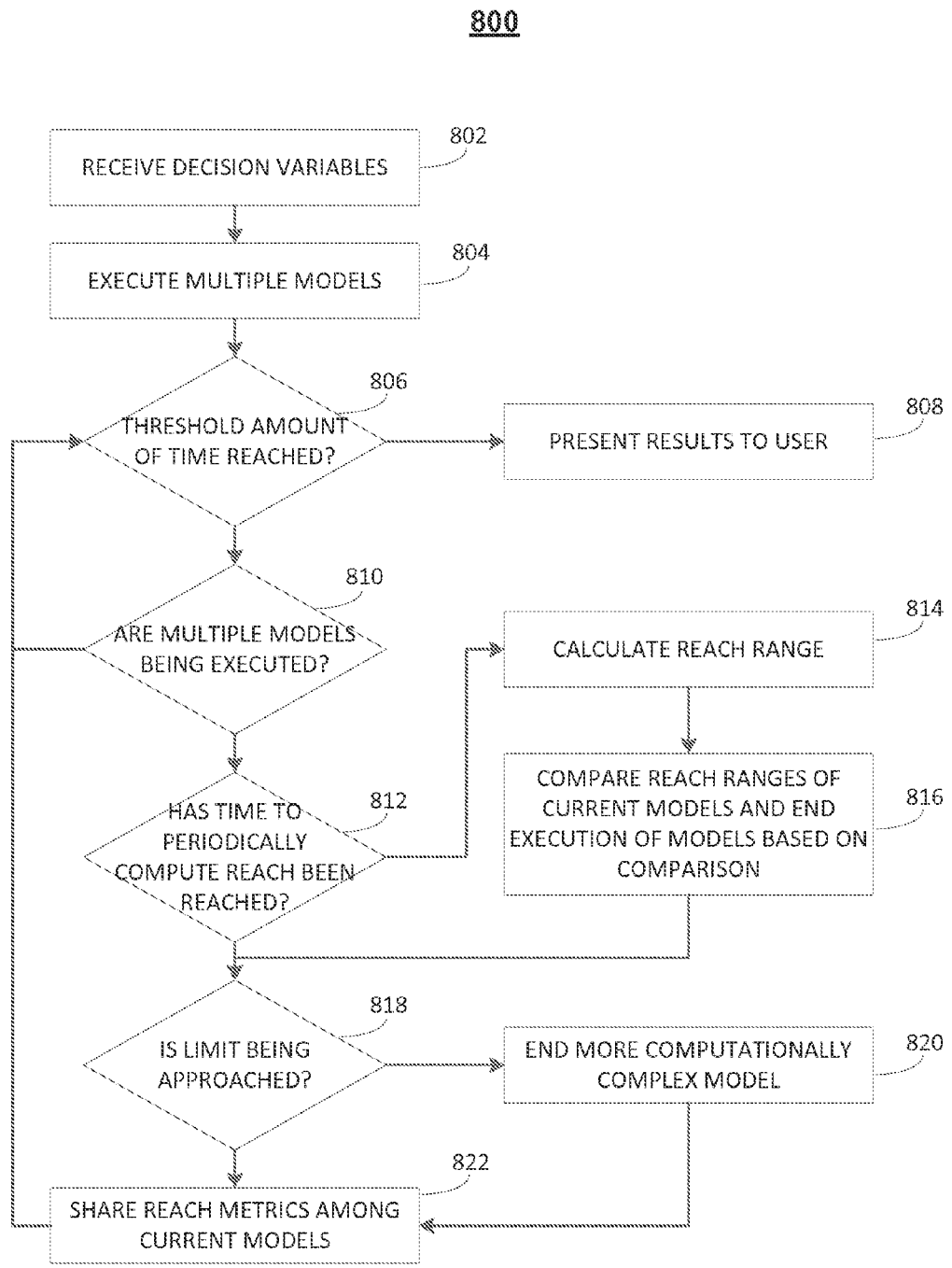
FIG. 8 shows an illustrative process for executing multiple models simultaneously in accordance with some embodiments of the disclosure.

FIG. 8 shows an illustrative process for executing multiple models simultaneously. Process 800 may be used by the optimization system to execute models 500 and 550 simultaneously. The optimization system may use process 800 to execute any number of models simultaneously.

Process 800 begins at block 802, when the optimization system receives decision variables from an advertisement manager through user input interface 310. For example, the optimization system may receive decision variables describing a demographic of retired males, a time slot of 4:00 pm-5:00 pm, and advertisements 30 seconds in length.

Process 800 continues to block 804, when the optimization system executes multiple models. The optimization system may execute any combination and number of linear and non-linear models. In some embodiments, the optimization system may select the models to execute based on the received decision variables. For example, the optimization system may always execute a cubic model if the decision variables describe advertisements 30 seconds in length. The optimization system may execute the multiple models simultaneously. In some embodiments, the optimization system may use control circuitry 304 to execute the multiple models.

Process 800 continues to block 806, when the optimization system determines whether the threshold amount of time has been reached. The optimization system may execute the models for a threshold amount of time. The optimization system may periodically compare the current execution time of the models with the threshold amount of time using control circuitry 304. If the threshold amount of time has been reached, process 800 proceeds to block 808. If the threshold amount of time has not been reached, process 800 proceeds to block 810.

Process 800 continues to block 808, when the optimization system ends the currently executed models and presents the results to the user. In some embodiments, the user may be the advertisement manager. If only one model was being executed, the optimization system uses control circuitry 304 to end the model currently being executed and presents the reach metrics calculated by the model to the user. If multiple models were being executed, the optimization system uses the control circuitry 304 to select one of the models and then present the reach metrics calculated by the model to the user. The optimization system may select one of multiple models by determining which model determined the highest reach metric, the most accurate reach metric, or analyzed the most combinations of decision variables. In some embodiments, the optimization system may use control circuitry 304 to calculate the average of the reach metrics calculated by all models, and present the result to the advertisement manager.

Process 800 continues to block 810, when the optimization system determines whether multiple models are currently being executed using control circuitry 304. In some embodiments, control circuitry 304 may use a table to track all models currently being executed. If the optimization system ends execution of a model, control circuitry 304 may remove the model from the table, or change its status in the table. In some embodiments, control circuitry 304 stores a measure of the models' computational complexity in the table as well. The computational complexity may be measured during the current execution of the model, or may be predetermined and retrieved from storage circuitry 308. If more than one model is currently being executed, process 800 proceeds to block 812. The optimization system can then end certain models' execution if needed. If only one model is currently being executed, process 800 proceeds to block 806.

Process 800 continues to block 812, when the optimization system determines whether the time to periodically calculate reach has been reached. In some embodiments, control circuitry 304 may determine whether the current execution time is divisible by the period for calculating reach values. For example, the optimization system may use control circuitry 304 to determine that the current execution time of the models, from the time when the models started execution at block 804 to the current time, is 40 seconds. The optimization system may further determine that reach should be calculated every 8 seconds. Since 40 is divisible by 8, the optimization system may determine that the time to periodically calculate reach has been reached. If the optimization system determines the time has been reached, process 800 proceeds to block 814. If the optimization system determines the time has not been reached, process 800 proceeds to block 818.

Process 800 proceeds to block 814, when the optimization system calculates range of reach. In some embodiments, the models being executed may determine impressions values. The optimization system may calculate, using control circuitry 304, reach from the impressions value. The optimization system may also calculate, using control circuitry 304, upper and lower bounds of reach from upper and lower bounds of impressions values, if they exist. In some embodiments, the optimization system may calculate rough estimates of reach values from the impressions values using heuristics or mathematical estimations. In some embodiments, if the models calculate reach instead of impressions values, then the optimization system may skip block 814 for those models. In some embodiments, calculating reach may be more computationally complex than calculating impressions values, so reach value may be calculated only periodically and not directly by the models.

Process 800 proceeds to block 816, when the optimization system compares reach ranges and ends execution of certain models if needed. In some embodiments, the optimization system may end execution of a first model if the upper bound of the first model is less than the lower bound of second model, as described in relation to FIG. 5. Control circuitry 304 may update its table of models currently being executed if the optimization system ends execution of a model. Control circuitry 304 may also redistribute computational resources among the models after resources are freed due to the ending of a model. In some embodiments, the optimization system may not end execution of any models. Process 800 then proceeds to block 818.

Process 800 proceeds to block 818, when the optimization system determines whether a limit is being approached. Limits are discussed above in relation to FIG. 7. If the optimization system determines a limit for at least one of the models using control circuitry 304, process 800 proceeds to block 820. If no limits are determined, process 800 proceeds to block 822.

Process 800 proceeds to block 820, when the optimization system ends more computationally complex models based on the models' limits. Control circuitry 304 may determine the complexity of each model by using the information present in its table of models currently being executed and their associated complexity. If the optimization system determines that two models have the same limit, the optimization system may end execution of the more computationally complex model. In some embodiments, if the optimization system determines that the difference between the limits associated with two models is less than a threshold difference, the optimization system may end execution of the more computationally complex model. In some embodiments, the optimization system may compare the limit associated with a first model to a upper bound, a lower bound, or a curve of a second model, if a limit is not available for the second model. In some embodiments, the optimization system may determine a trend for a model and estimate the model's output value at the end of the execution time based on the model's trend. The optimization system may then use the estimated output at the end of the execution time as the limit of the model. Process 800 then proceeds to block 822.

Process 800 proceeds to block 822, when the optimization system trades reach metrics among the models currently being executed. Control circuitry 304 may use output values from one model as an input in another model to tweak the coefficients being used in the model and calculate more consistent results between models. Process 800 then proceeds to block 806.

Figure 9:
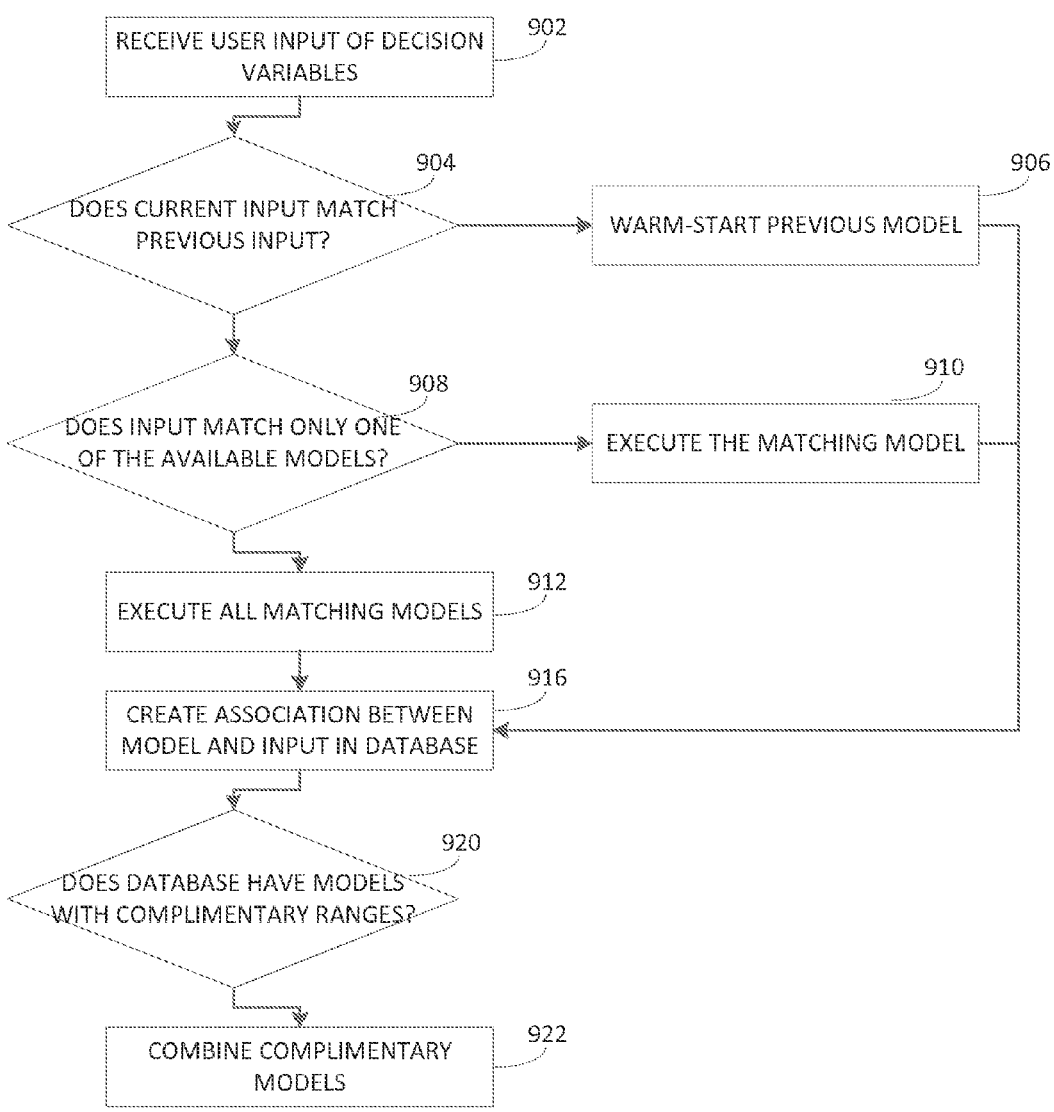
FIG. 9 shows an illustrative process for beginning execution of multiple models in accordance with some embodiments of the disclosure.

FIG. 9 shows an illustrative process for beginning execution of multiple models. Process 900 maybe used to begin execution of models 500 and 550. Process 900 may be used to begin execution of any number and combination of models.

Process 900 begins as block 902, when the optimization system receives user input of decision variables. The optimization system may receive the input in a manner similar to that described in relation to block 802.

Process 900 proceeds to block 904, when the optimization system determines whether the current input matches a previous input. If the optimization system determines that a current input matches a previous input, process 900 proceeds to block 906. If the optimization system determines that a current input does not match a previous input, process 900 proceeds to block 908.

Control circuitry 304 may store a list of previously received inputs in storage circuitry 308. In some embodiments, the optimization system may determine that the current input matches a previous input if the current input is identical to an input in the list of previously received input. In some embodiments, the optimization system may determine that a current input matches a previous input if the current input is a subset of a previous input in the list of previously received input. For example, control circuitry 304 may determine that a current input of decision variables describing television programs broadcast between 7:00 pm and 8:00 pm is a subset of a previous input of decision variables describing television programs broadcast between 6:00 pm and 9:00 pm. Hence, the optimization system may determine that the current input matches a previous input. In some embodiments, the optimization system may determine that the current input matches a previous input if a difference between the current input and a previous input is less than a threshold difference. For example, if a current input of decision variables describes first-run programs on channel 7, and a previous input describes repeat programs on channel 7, control circuitry 304 may determine that the difference between these inputs is less than a threshold difference. Hence, the optimization system may determine that the current input matches a previous input.

Process 900 proceeds to block 906, when the optimization system warm-starts the previous model. The optimization system may send the previous model the output from the previous execution of the previous model, to increase the previous model's accuracy and/or precision in the current execution. Warm-start models are described in further detail in relation to FIG. 6. Process 900 then proceeds to block 916.

Process 900 proceeds to block 908, when the optimization system determines whether the input matches only one of the available models. In some embodiments, control circuitry 304 may store a list of all available models and their corresponding requirements using storage circuitry 308. Control circuitry 304 may compare the input decision variables to the requirements of all available models to determine which available models the input matches. For example, model A may have the requirement of being applicable only to broadcast television programs, model B may have the requirement of being applicable only for advertisement campaigns costing under $1 million, and model C may have the requirement of being applicable only for advertisement campaigns targeted towards males. The optimization system may receive user input including decision variables describing a $500,000 campaign targeted to females using broadcast television. Control circuitry 304 may compare the user input to the requirements of the available models to determine that models A and B match the user input.

If the optimization system determines that the input matches only one of the available models, process 900 proceeds to block 910. If the optimization system determines that the input matches more than one available model, process 900 proceeds to block 912. In some embodiments, the optimization system may use any threshold number for this comparison. For example, the optimization system may determine whether the input matches three of the available models.

Process 900 proceeds to block 910, when the optimization system begins execution of the matching model. Control circuitry 304 may execute the matching model as described in relation to FIG. 8. After the model has been executed, process 900 proceeds to block 916.

Process 900 proceeds to block 912, when the optimization system begins execution of all matching models determined to match the input at block 908. In some embodiments, control circuitry 304 may execute the multiple models in separate partitions, threads, cores, or virtual machines to keep the models separate. In some embodiments, control circuitry 304 may execute only a threshold number of multiple models. For example, if control circuitry 304 determines at block 908 that five models match the input, and the threshold number of models that can be simultaneously executed is three, control circuitry 304 may select three models with the least computational complexity to execute simultaneously. The models may be executed as described in relation to FIG. 8.

Process 900 proceeds to block 916, when the optimization system creates an association in a database. Storage circuitry 308 may include a database with associations between various inputs entered and corresponding models executed. This database may be used by control circuitry 304 to determine whether a current input matches a previous input at block 904. This database may also include information about the output of each execution of a model. Control circuitry 304 may use this information from the database to warm-start a previous model at block 906. This database may also include information about the requirements associated with each model. Control circuitry 304 may use this information to determine if the input matches one or more available models at block 908. Storage circuitry 308 may store this database in the form of a list, wherein each model in the list is associated with multiple inputs and results of executions.

Control circuitry 304 may edit the database in storage circuitry 308 to include an association between the models executed and the input received at block 902. Control circuitry 304 may further edit the database in storage circuitry 308 to include information about the output of each execution of the models. In some embodiments, models whose execution was ended early as described in relation to blocks 816 and 820 may not have associations created for them in the database. In some embodiments, models whose execution was ended early as described in relation to blocks 816 and 820 may have associations created for them in the database along with an indication that the models' execution was ended early.

Process 900 proceeds to block 920, when the optimization system determines whether the database in storage circuitry 308 includes models with complimentary ranges. Control circuitry 304 may analyze each model and the inputs associated with it to determine of models have complimentary ranges. Control circuitry 304 may determine that models are complimentary if they are associated with mutually exclusive decision variables. For example, control circuitry 304 may determine that model A is executed without being ended early for advertisement campaigns costing under $1 million, while model B is executed without being ended early for advertisement campaigns costing above $1 million. Control circuitry 304 may further determine that the decision variable describing campaigns costing under $1 million is mutually exclusive with the decision variable describing campaigns costing above $1 million. Control circuitry 304 may hence determine these models are complimentary. If the optimization system determines the database has models with complimentary ranges, process 900 continues to block 922. If the optimization system determines the database has no models with complimentary ranges, process 900 ends.

Process 900 proceeds to block 922, when the optimization system combines complimentary models. For example, control circuitry 304 may determine that models A and B are complimentary because model A is executed without being ended early for advertisement campaigns costing under $1 million, while model B is executed without being ended early for advertisement campaigns costing above $1 million. Control circuitry 304 may create a new model which uses information from model A for decision variables describing campaign costs under $1 million, and information from model B for decision variables describing campaign costs above $1 million. Control circuitry 304 may store this new model in the database.

Figure 10:
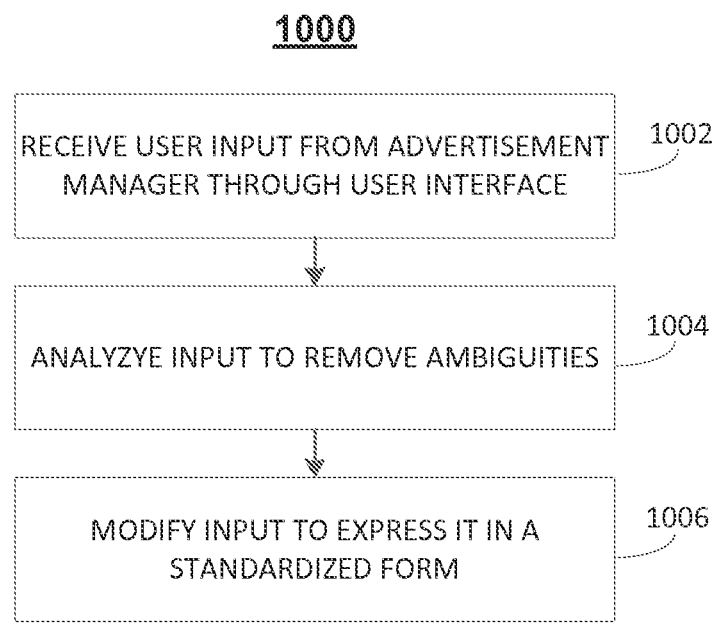
FIG. 10 shows an illustrative process for processing user input of decision variables in accordance with some embodiments of the disclosure.

FIG. 10 shows an illustrative process for processing user input of decision variables. User input may be received from an advertisement manager. Any number or combination of decision variables may be received using process 1000.

Process 1000 begins at block 1002, when the optimization system receives user input from an advertisement manager through a user interface. In some embodiments, the optimization system may receive user input from a user interface accessed by the advertisement manager through user input interface 310. In some embodiments, the optimization system may receive user input through communications network 414 from a user interface accessed by the advertisement manager at a remote location. In some embodiments, the optimization system may use the user interface to provide predetermined options for the advertisement manager to select. In some embodiments, the optimization system may use the user interface to allow the advertisement manager to enter in free-form input describing decision variables.

Process 1000 proceeds to block 1004, when the optimization system analyzes the user input to remove ambiguities. Removing ambiguities may comprise analyzing the user input and processing it to replace natural language identifiers with specific identifiers of media assets, channels, times, zip codes, and the like.

In some embodiments, the optimization system may map target demographic information to particular media assets. For example, control circuitry 304 may determine that the user input includes decision variables describing a target audience of toddlers. Control circuitry 304 may determine that television programs "Bob the Builder" and "Bubble Guppies" are targeted at toddlers, and replace the user input decision variables with decision variables describing the media assets "Bob the Builder" and "Bubble Guppies."

In some embodiments, the optimization system may map location information to specific zip codes. For example, control circuitry 304 may determine that the user input includes decision variables describing a target location of New York City. Control circuitry 304 may identify zip codes associated with New York City, and replace the user input decision variables with decision variables identifying New York City zip codes.

In some embodiments, the optimization system may map channel attributes to specific channels. For example, control circuitry 304 may determine that the user input includes decision variables describing channels targeted towards women. Control circuitry 304 may determine that channels 5 and 8 are targeted at women, and replace the user input decision variables with decision variables describing channels 5 and 8.

Process 1000 proceeds to block 1006, when the optimization system modifies the input to express it in a standardized form. In some embodiments, the optimization system may include a standard template for user input with fields such as "media assets," "times (hh:mm:ss)," "length of advertisement (seconds)," "channels," "zip codes," and the like. The optimization system may modify the input to express it using this standardized template.

For example, control circuitry 304 may receive, from user input interface 310, user input including decision variables that describe a target audience of toddlers, a location of New York City, and channels targeted at women. As described above, control circuitry 304 may remove ambiguities from this input. Control circuitry 304 may then express this user input in a standardized form as follows. Control circuitry 304 may include default information for fields such as "times" and "length of advertisement" where no user input information exists.

TABLE 1

Standardized form of user input

| | |
|---|---|
| Media Assets | "Bob the Builder," "Bubble Guppies" |
| Times (hh:mm:ss) | All |
| Length of Advertisement (seconds) | All |

TABLE 1-continued

Standardized form of user input

| | |
|---|---|
| Channels | 5 and 8 |
| Zip Codes | 10001, 10018, 10026, 10060 |

Figure 11:
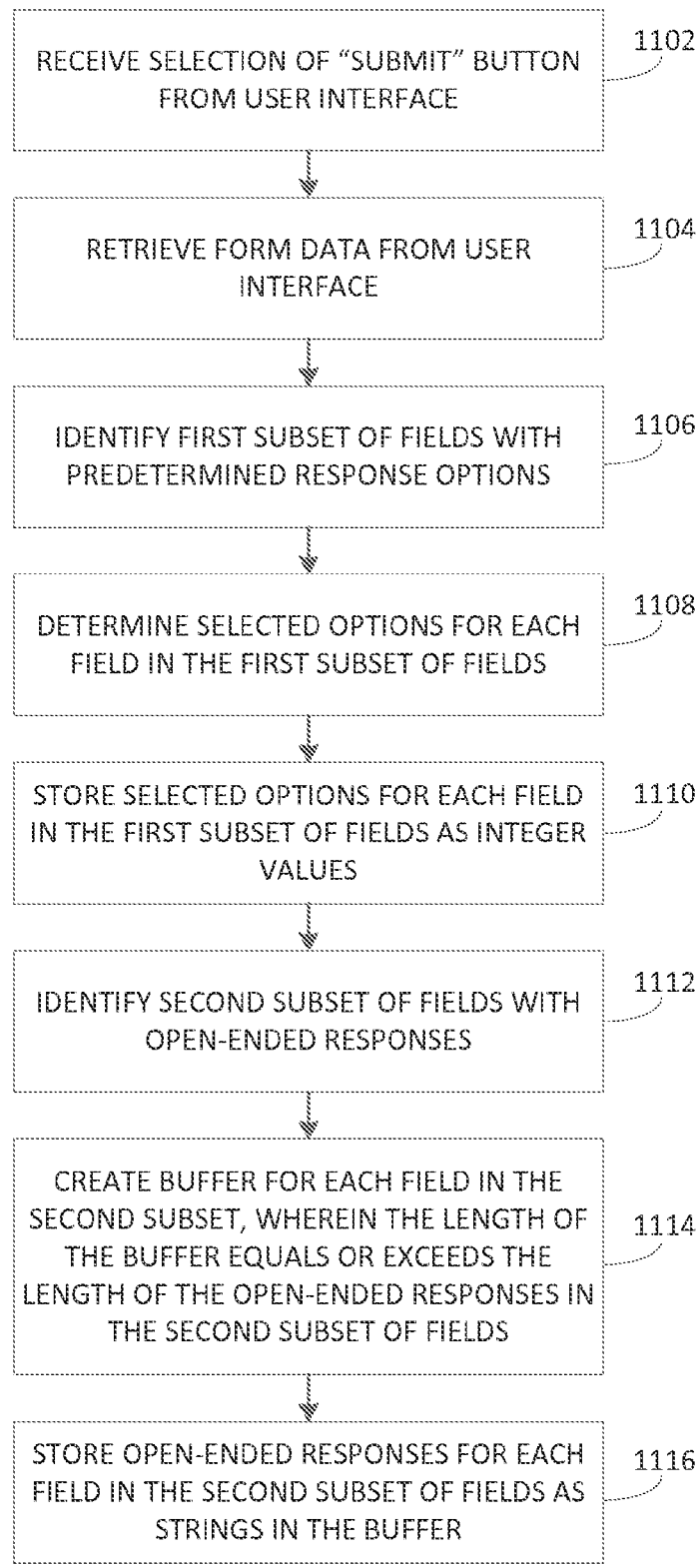
FIG. 11 shows an illustrative process by which the optimization system can receive user input of decision variables in accordance with some embodiments of the disclosure.

FIG. 11 shows an exemplary process 1100 by which control circuitry 304 can receive user input of decision variables using user input interface 310. Display 312 may display a form to an advertisement manager, the form containing various options, menus, buttons, checkboxes, radio buttons, or text fields associated with different decision variables. The advertisement campaign manager may be able to choose any combination of decision variables using this form. In some embodiments, the advertisement campaign manager may verbally enter information into the form using speech-to-text software.

Process 1100 begins at block 1102, when the optimization system receives selection of a "submit" button in the user interface used by the advertisement manager. Control circuitry 304 may receive a user selection in the form of a click using a mouse, a brief touch using a touchscreen, a verbal commend through a speech-to-text software, or any such manipulation using user input interface 310. An advertisement campaign manager may select the "submit" button after completing the form and selecting the desired decision variables.

Process 1100 proceeds to block 1104, when the optimization system retrieves data from the user interface. The user interface may be the form used by the advertisement campaign manager. Control circuitry 304 may proceed sequentially through each form field and store the user input associated with each form field using storage circuitry 308. The data from each form field may be stored as a boolean, a number, or a text value. For example, control circuitry 304 may store a radio button selection of either a "Yes" or a "No" option as a boolean value. In another example, control circuitry 304 may store a budget text field entry of "$1000" as a number value. In another example, control circuitry 304 may store a desired demographic text field entry as a text value of "women under 30." In some embodiments, the optimization system may send the stored data using communications network 414 to a separate server for analyzing user input.

Process 1100 proceeds to block 1106, when the optimization system identifies a first subset of fields with predetermined response options. Control circuitry 304 may determine a field has predetermined response options if an advertisement campaign manager can only enter a finite number of responses for the field. For example, control circuitry 304 may determine that drop-down menus, radio buttons, and checkbox buttons have predetermined response options. Control circuitry 304 may identify the first subset by sequentially identifying the type of each field in the user interface, and determining which fields have finite response options.

Process 1100 proceeds to block 1108, when the optimization system determines selected options for each field in the first subset of fields. Control circuitry 304 may retrieve the user input stored at block 1104 and determine which of the finite options associated with each field was selected by the advertisement campaign manager.

Process 1100 proceeds to block 1110, when the optimization system stores selected options for each field in the first subset of fields as integer values. Control circuitry 304 may associate each option of the finite number of options for a field with an integer value, and store the integer value(s) corresponding to the user selected options. For example, a field for selected desired geographical range may have four options, any number of which can be selected by the user using checkbox buttons. The four options may be: "East," "West," "North," and "South." Control circuitry 304 may associate these three options with the integers 0, 1, 2, and 3, respectively. Control circuitry 304 may retrieve data indicating the user selected options "East" and "North" and store these as text values at block 1104. Control circuitry 304 may then retrieve these text values, determine they correspond to integer values of 0 and 2, and store integer values 0 and 2 associated with the geographical range field using storage circuitry 308. In some embodiments, control circuitry 304 may delete the text values stored at block 1104 once integer values have been stored at block 1110.

Process 1100 proceeds to block 1112, when the optimization system identifies a second subset of fields with open-ended responses. Control circuitry 304 may determine that a field has open-ended responses if users can enter any alphanumeric combination as input associated with that field. For example, fields with open-ended input may include text input, numerical values, and numerical ranges.

Process 1100 proceeds to block 1114, when the optimization system creates a buffer for each field in the second subset, wherein the length of the buffer equals or exceeds the length of the open-ended responses in the second subset of fields. In some embodiments, control circuitry 304 may create a single buffer to store all open-ended user input fields. In some embodiments, control circuitry 304 may create separate buffers associated with each open-ended user input field.

Process 1100 proceeds to block 1116, when the optimization system stores the open-ended responses for each field in the second subset of fields as strings in the buffer. In some embodiments, control circuitry 304 may store the user input as text in the buffer, and store the buffer in long-term memory using storage circuitry 308. In some embodiments, control circuitry 304 may edit the text to standardize it before storage, as described in relation to FIG. 10.

Figure 12:
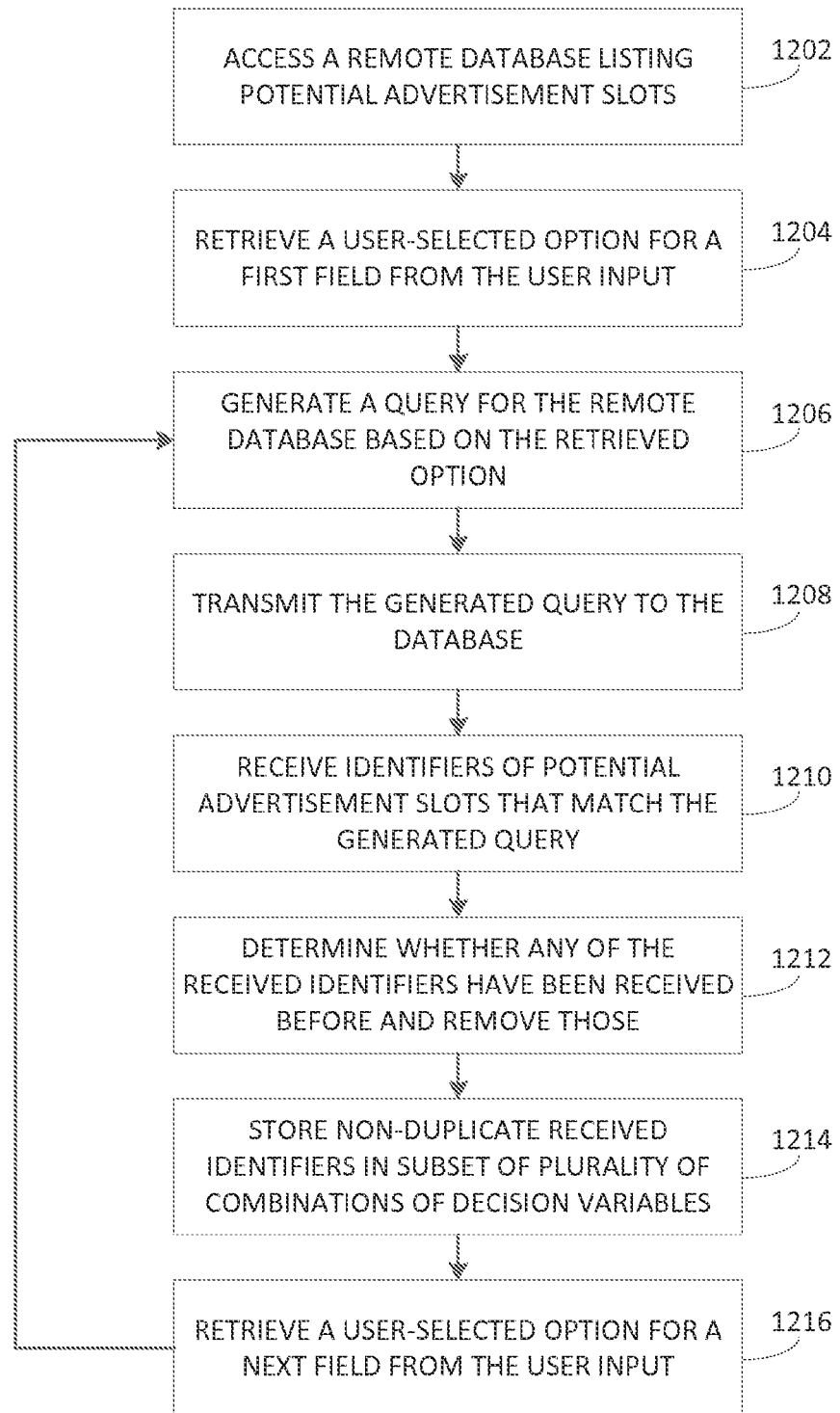
FIG. 12 shows an illustrative process for retrieving advertisement slot identifiers associated with a subset of the plurality of received combination of decision variables in accordance with some embodiments of the disclosure.

FIG. 12 shows an illustrative process 1200 for retrieving advertisement slot identifiers associated with a subset of the plurality of received combination of decision variables. Process 1200 may be used to execute blocks 1604 and 1608. Process 1200 may use as an input combinations of decision variables received from an advertisement campaign manager, as described in relation to FIG. 11.

Process 1200 begins at block 1202, when the optimization system accesses a remote database listing potential advertisement slots. In some embodiments, the remote database may be associated with media content source 416 or media guidance data source 418. Control circuitry 304 may access the remote database using communications network 414. In some embodiments, the potential advertisement slots may include advertisement slots during television programs, on-demand movies, interactive Internet content, or any other media asset that allows advertisement placement.

Process 1200 proceeds to block 1204, when the optimization system retrieves a user-selected option for a first field from the user input. In some embodiments, the user input may have been processed as described in relation to FIG. 11. For example, control circuitry 304 may retrieve a user-selected option for a field such as a selected option of "$1000" for a budget field. Control circuitry 304 may retrieve the user-selected option using storage circuitry 308.

Process 1200 proceeds to block 1206, when the optimization system generates a query for the remote database based on the retrieved option. Control circuitry 304 may generate a query in a standardized format. For example, if control circuitry 304 received a user-selected budget value of "$1000," control circuitry 304 may generate a query of the form: "BUDGET_VALUE<=1000.00?". The query format may be generated based on database rules, XML formatting, or any other appropriate markup language.

Process 1200 proceeds to block 1208, when the optimization system transmits the generated query to the database. Control circuitry 304 may transmit the query using communications network 414.

Process 1200 proceeds to block 1210, when the optimization system receives identifiers of potential advertisement slots that match the generated query. For example, control circuitry 304 may receive identifiers of advertisement slots that would fit into a budget of under $1000. The remote database may generate these identifiers by cross-referencing the received query with information associated with advertisement slots stored in the remote database. Control circuitry 304 may receive any number of identifiers. Control circuitry 304 may store the received identifiers in a temporary cache using storage circuitry 308.

Process 1200 proceeds to block 1212, when the optimization system determines whether any of the received identifiers have been received before, and remove those. Control circuitry 304 may perform this determination to create a set including only unique identifiers of advertisement slots, and no duplicate identifiers of advertisement slots.

Process 1200 proceeds to block 1214, when the optimization system stores non-duplicate received identifiers in a subset of plurality of combinations of decision variables. Control circuitry 304 may transfer the non-duplicate received identifiers from a temporary cache to long-term storage. Control circuitry 304 may then delete the data in the temporary cache.

Process 1200 proceeds to block 1216, when the optimization system retrieves a user-selected option for a next field from the user input. Block 1216 may be performed by control circuitry 304 in a manner similar to block 1206. In some embodiments, process 1200 may be terminated if no further fields of user input are available, and all fields have been processed by control circuitry 304 using process 1200. Process 1200 then returns to block 1206.

Figure 13:
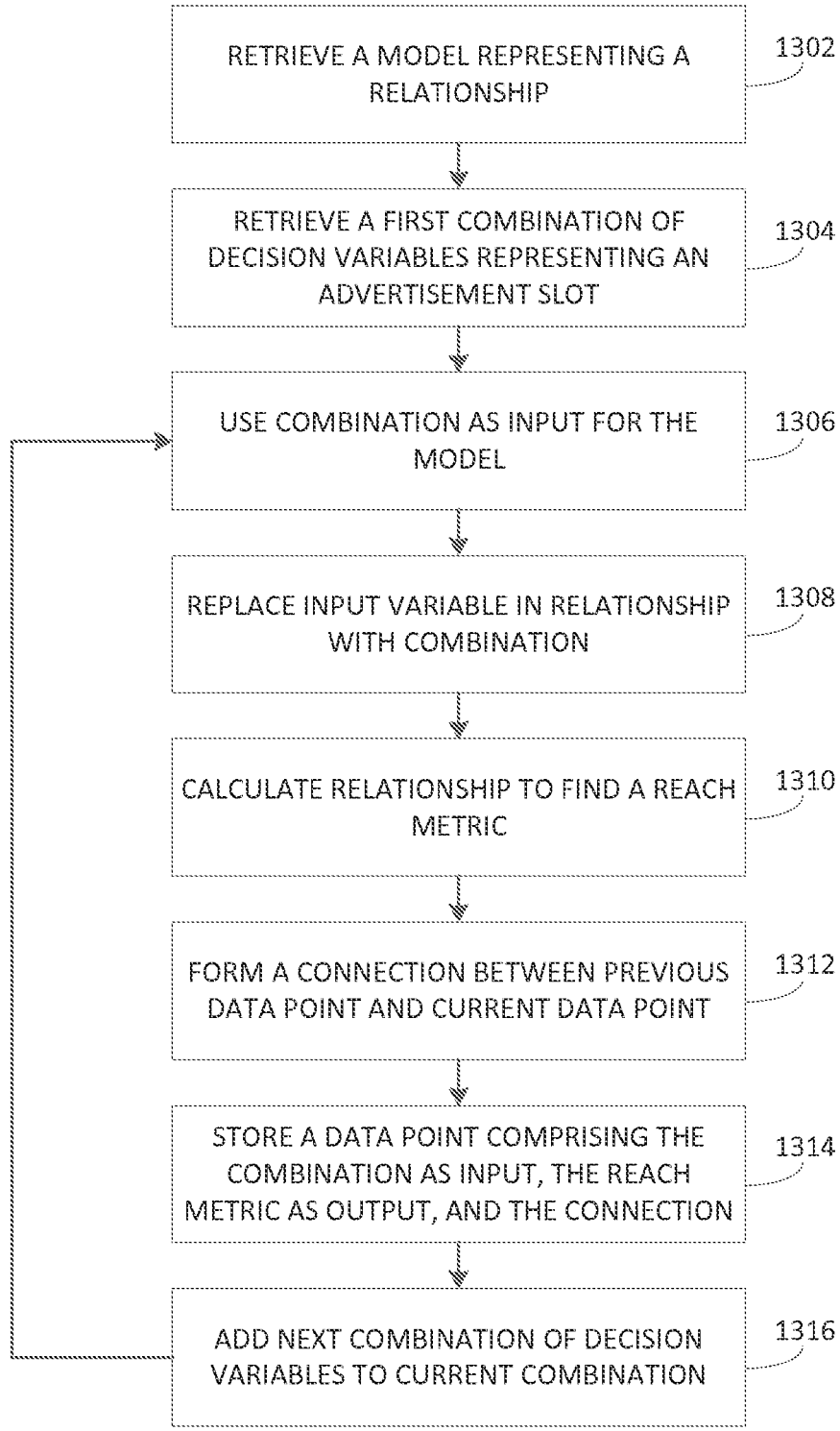
FIG. 13 shows an illustrative process for applying a subset of decision variables to a model in accordance with some embodiments of the disclosure.

FIG. 13 shows an illustrative process 1300 for applying a subset of decision variables to a model. The decision variables may be received from an advertisement campaign manager as described in relation to FIG. 11.

Process 1300 begins at block 1302, when the optimization system retrieves a model representing a relationship. Control circuitry 304 may retrieve the model from a remote source or from local memory using communications network 414 and/or storage circuitry 308. The model may be a linear, non-linear, piecewise, or any other type of model. In some embodiments, the model may be expressed as a mathematical function. In some embodiments, the model may be expressed as a graph.

Process 1300 proceeds to block 1304, when the optimization system retrieves a first combination of decision variables representing an advertisement slot. Control circuitry 304 may generate all possible permutations of the user input combinations of decision variables. Control circuitry 304 may then randomly select one of these permutations as the first permutation, or select the first permutation in the sequence. For example, control circuitry 304 may use decision variables "ad slot for New York City," "ad slot for Boston," and "cost between $41 and $42" to generate the following permutations: {New York City, $41}, {New York City, $42}, {Boston, $41}, and {Boston, $42}. Control circuitry 304 may then select {New York City, $41} as the first combination, and sequentially select the other permutations in further iterations of process 1300.

Process 1300 proceeds to block 1306, when the optimization system uses the combination as an input for the model. The model may take as an input combinations of decision variables and produce as an output reach metrics, such as a reach or impressions value. The combination of decision variables may be represented as numbers to be used as an input for the model. Control circuitry 304 may represent the decision variables as numbers as described in relation to block 1100.

Process 1300 proceeds to block 1308, when the optimization system replaces the input variable in the relationship associated with the model with the selected combination of decision inputs. For example, control circuitry 304 may replace a variable with a value corresponding to the selected combination in a mathematical relationship associated with the model. In another example, control circuitry 304 may determine a value corresponding to the combination on a graph associated with the model.

Process 1300 proceeds to block 1310, when the optimization system calculates the relationship to find a reach metric. In some embodiments, control circuitry 304 may calculate a reach metric, as well as an upper bound and a lower bound for the reach metric to represent uncertainty or flexibility in the model. In one example, control circuitry 304 may replace a variable with a value corresponding to the selected combination in a mathematical relationship associated with the model, and then calculate the mathematical relationship to determine a result. In another example, control circuitry 304 may determine a value corresponding to the combination on a graph associated with the model, and then determine a value on the x-axis or y-axis corresponding to the value.

Process 1300 proceeds to block 1312, when the optimization system forms a connection between a previous data point and a current data point. In some embodiments, control circuitry 304 may use a default value as a previous data point if none exists. Control circuitry 304 may determine a trend for the graph based on the connection between the previous data point and the current data point. In some embodiments, control circuitry 304 may use the connection as an error check. For example, control circuitry 304 may determine that no connection associated with a particular model should have a negative slope. If control circuitry 304 creates a connection with a negative slope associated with the current data point, control circuitry 304 may discard the current data point or recalculate the current data point.

Process 1300 proceeds to block 1314, when the optimization system stores a data point comprising the combination as input, the reach metric as output, and the connection. For example, control circuitry 304 may use an input of {New York City, $41} to determine that it will result in an impressions value of 4000. Control circuitry 304 may also determine a connection between a previous data point and the data point has a slope of 2. Control circuitry 304 may store the following data structure using storage circuitry 308: {{New York City, $41}, 4000, 2}.

Process 1300 proceeds to block 1316, when the optimization system adds the next combination of decision variables to the current combination. For example, control circuitry 304 may perform the next iteration of process 1300 with the combination of decision variables made by combining current combination ({New York City, $41}) to a next combination ({New York City, $42}). Process 1300 then returns to block 1306. If control circuitry 304 determines no further combinations of decision variables are left to be used as an input for the model, control circuitry 304 may terminate process 1300.

Figure 14:
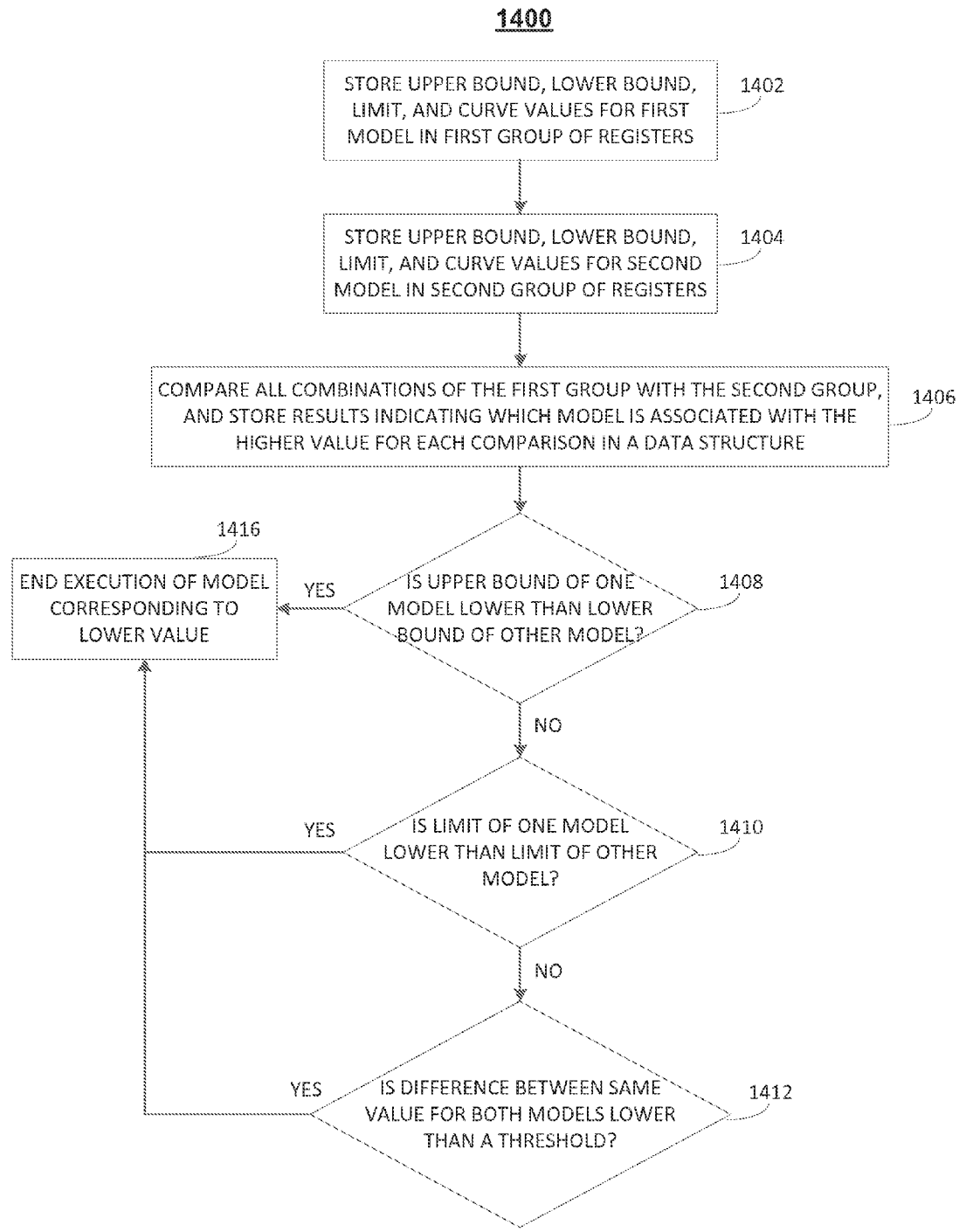
FIG. 14 shows an illustrative process for comparing the reach metrics output by one model to the reach metrics output by another model in accordance with some embodiments of the disclosure.

FIG. 14 shows an illustrative process 1400 for comparing the reach metrics output by one model to the reach metrics output by another model. It is understood that any number of models and their output values may be compared as discussed in relation to process 1400.

Process 1400 begins at block 1402, when the optimization system stores an upper bound, a lower bound, a limit, and curve values for a first model in a first group of registers. Control circuitry 304 may store these values as integer or floating point values. Control circuitry 304 may store a "Not an Integer" or "NaN" value if one of these values does not exist. The curve value may represent an output reach metric value obtained from a model. Control circuitry 304 may retrieve these values from storage circuitry 308 and store them in the registers. Control circuitry 304 may store these values in registers because it is quicker to compare values in registers than it is to compare values stored using storage circuitry 308.

Process 1400 proceeds to block 1404, when the optimization system stores an upper bound, a lower bound, a limit, and curve values for a second model in a second group of registers. Control circuitry 304 may perform as discussed in relation to block 1402.

Process 1400 proceeds to block 1406, when the optimization system compares all combinations of the first group of registers with the second group of registers, and stores the results indicating which model is associated with the higher value for each comparison in a data structure. For example, control circuitry 304 may determine that an upper bound of a first model is more than an upper bound of a second model and more than a lower bound of a second model. Control circuitry 304 may further determine that a lower bound of a first model is less than an upper bound of a second model and a lower bound of a second model. Control circuitry 304 may store these comparison results as {first model, first model, second model, second model} using storage circuitry 308. If a "NaN" value is involved in a comparison, control circuitry 304 my store a "null" value as the comparison result to indicate the comparison did not occur. Control circuitry 304 may use these stored results to perform the determinations in blocks 1408-1412.

Process 1400 proceeds to block 1408, when the optimization system determines whether the upper bound of a first model is lower than the lower bound of a second model. If control circuitry 304 determines this condition is true, process 1400 proceeds to block 1416 and control circuitry 304 ends execution of the first model. If control circuitry 304 determines this condition is not true, process 1400 proceeds to block 1410.

Process 1400 proceeds to block 1410, when the optimization system determines whether a limit of a first model is lower than a limit of a second model. If control circuitry 304 determines this condition is true, process 1400 proceeds to block 1416, and control circuitry 304 ends execution of the first model. If control circuitry 304 determines this condition is not true, process 1400 proceeds to block 1412.

Process 1400 proceeds to block 1412, when the optimization system determines whether the difference between the same value for both models is lower than a threshold. For example, control circuitry 304 may determine whether the difference between lower bounds for both models is lower than a threshold. If control circuitry 304 determines this condition is true, process 1400 proceeds to block 1416, and control circuitry 304 ends execution of the more computationally complex model. If control circuitry 304 determines this condition is not true, control circuitry 304 ends execution of process 1400.

Figure 15:
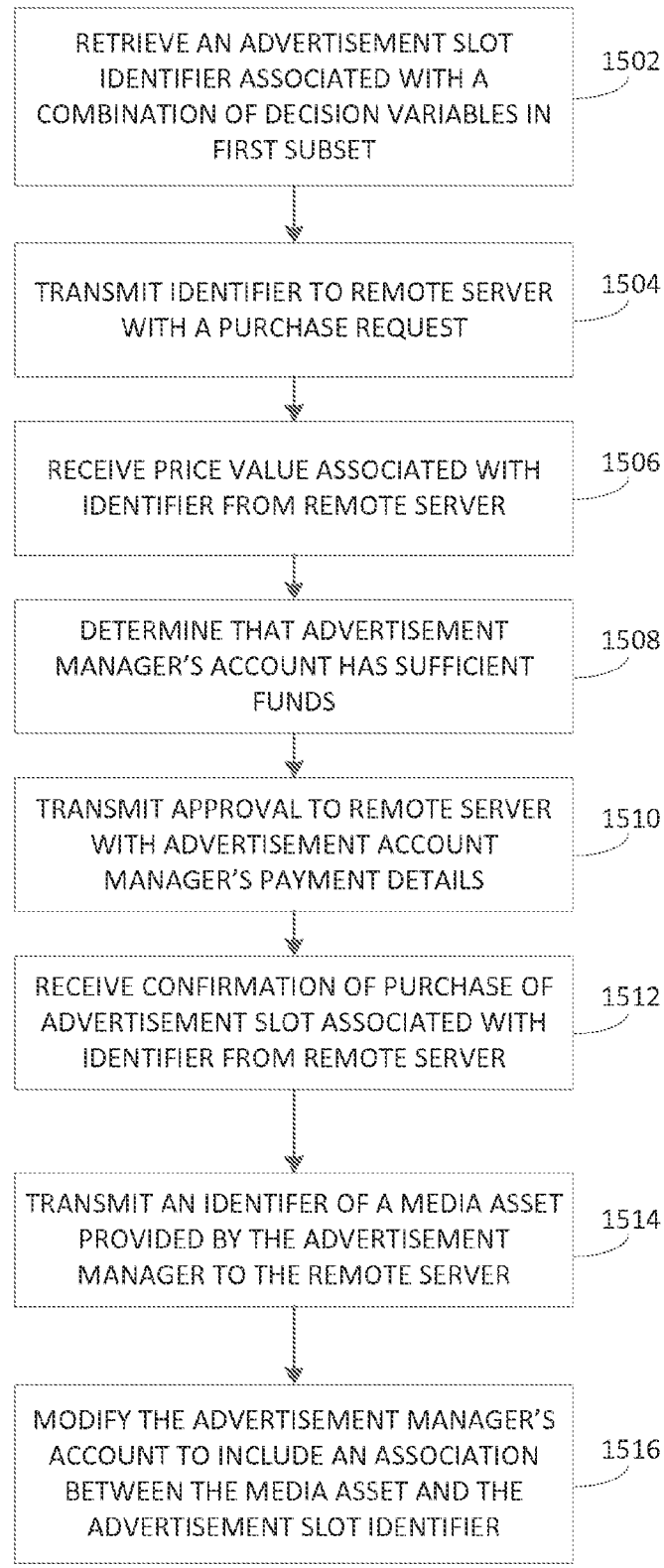
FIG. 15 shows an illustrative process for storing an identifier of a media asset in a media placement slot in accordance with some embodiments of the disclosure.

FIG. 15 shows an illustrative process 1500 for storing an identifier of a media asset in a media placement slot. The optimization system may use process 1500 for buying advertisement slots based on the output of the optimization models. The optimization system may buy advertisement slots on behalf of an advertisement campaign manager in accordance with decision variables input by the advertisement campaign manager.

Process 1500 begins at block 1502, when the optimization system retrieves an advertisement slot identifier associated with a combination of decision variables in a first subset. Control circuitry 304 may use process 1200 for retrieving advertisement slot identifiers.

Process 1500 proceeds to block 1504, when the optimization system transmits an identifier to a remote server with a purchase request. The remote server may be a media placement database. Control circuitry 304 may transmit the identifier using communications network 414. The remote server may be configured to process purchasing requests and allow advertisement campaign managers to purchase advertisement slots.

Process 1500 proceeds to block 1506, when the optimization system receives a price value associated with identifier from remote server. Control circuitry 304 may receive the price value using communications network 414.

Process 1500 proceeds to block 1508, when the optimization system determines that an advertisement campaign manager's account has sufficient funds. For example, if control circuitry 304 received a price value of $40 and an advertisement campaign manager's account has $400, control circuitry 304 may determine the advertisement campaign manager's account has sufficient funds. In another example, if control circuitry 304 received a price value of $40 and an advertisement campaign manager's account has $4, control circuitry 304 may determine the advertisement campaign manager's account does not have sufficient funds, and terminate process 1500.

Process 1500 proceeds to block 1510, when the optimization system transmits approval to the remote server with the advertisement campaign manager's payment details. The payment details may include credit card information, bank account information, an escrow account information, and the like.

Process 1500 proceeds to block 1512, when the optimization system receives confirmation of purchase of an advertisement slot associated with the identifier from the remote server. The confirmation may indicate that the advertisement campaign manager is allowed to display an advertisement during the advertisement slot.

Process 1500 proceeds to block 1514, when the optimization system transmits an identifier of a media asset provided by the advertisement campaign manager to the remote server. For example, control circuitry 304 may receive confirmation an advertisement slot has been purchased. Control circuitry 304 may then transmit to the remote server, using communications network 414, an advertisement that should be provided to viewers during the advertisement slot.

Process 1500 proceeds to block 1516, when the optimization system modifies the advertisement campaign manager's account to include an association between the media asset and the advertisement slot identifier. Control circuitry 304 may generate an association to confirm to the advertisement campaign manager that a certain advertisement will be displayed during an advertisement slot. In some embodiments, control circuitry 304 may also modify the funds associated with the advertising campaign manager's account. For example, if control circuitry 304 bought an advertisement slot with a price value of $40 and an advertisement campaign manager's account had $400, control circuitry 304 may modify the advertisement campaign manager's account to include $360.

Figure 16:
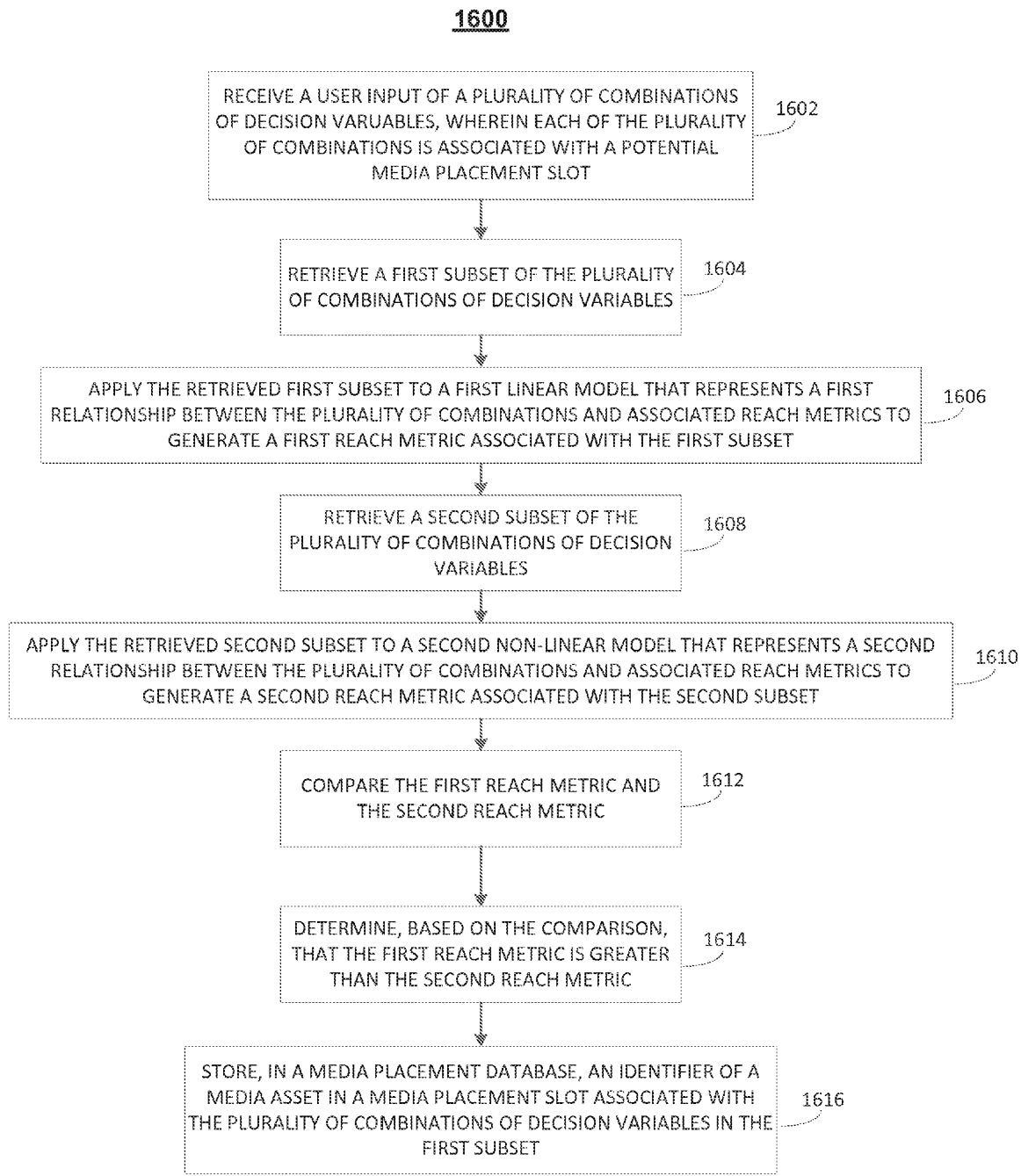
FIG. 16 shows an illustrative process for using multiple optimization models to optimize reach in accordance with some embodiments of the disclosure.

FIG. 16 shows an illustrative process 1600 for using multiple optimization models to optimize reach. Process 1600 may be performed by the optimization system in response to input received from an advertisement campaign manager. Although process 1600 is described in relation to two models for illustrative purposes, it is understood any number of models may be used in a similar manner.

Process 1600 begins at block 1602, when the optimization system receives a user input of a plurality of combinations of decision variables, wherein each of the plurality of combinations is associated with a potential media placement slot. Control circuitry 304 may execute block 1602 as described in relation to FIGS. 10 and 11.

Process 1600 proceeds to block 1604, when the optimization system retrieves a first subset of the plurality of combinations of decision variables. Process 1600 then proceeds to block 1606, when the optimization system applies the retrieved first subset to a first linear model that represents a first relationship between the plurality of combinations and associated reach metrics to generate a first reach metric associated with the first subset. Control circuitry 304 may perform this process as described in relation to FIG. 13.

Process 1600 also proceeds to block 1608, when the optimization system retrieves a second subset of the plurality of combinations of decision variables. Process 1600 then proceeds to block 1610, when the optimization system applies the retrieved second subset to a second non-linear model that represents a second relationship between the plurality of combinations and associated reach metrics to generate a second reach metric associated with the second subset. Control circuitry 304 may execute these blocks as described in relation to blocks 1604 and 1606 respectively. Control circuitry 304 may execute blocks 1604 and 1606 in parallel with blocks 1608 and 1610.

Process 1600 proceeds to block 1612, when the optimization system compares the first reach metric and the second reach metric. Process 1600 then proceeds to block 1614, when the optimization system determines, based on the comparison in block 1612, that the first reach metric is greater than the second reach metric. Control circuitry 304 may execute blocks 1612 and 1614 as described in relation to FIG. 14. In some embodiments, control circuitry 304 may execute blocks 1604-1614 in a loop until a threshold execution time has been reached.

Process 1600 then proceeds to block 1616, when the optimization system stores, in a media placement database, an identifier of a media asset in a media placement slot associated with the plurality of combinations of decision variables in the first subset. Control circuitry 304 may execute block 1616 as described in relation to FIG. 15. Control circuitry 304 may terminate process 1600 once block 1616 has been executed.

It should be noted that processes 800-1600, or any step thereof could be performed on, or provided by, the optimization system on any of the devices shown in FIGS. 3-4. For example, processes 800-1600 may be executed by processing circuitry 304 (FIG. 3) as instructed by processing circuitry implemented on user equipment 402, 404, and/or 406 (FIG. 4) in order to provide information to a user. In addition, one or more steps of processes 800-1600 may be incorporated into, or combined with, one or more steps of any other process or embodiment.

It is contemplated that the steps or descriptions of FIGS. 8-16 may be used with any other embodiment of this disclosure. In addition, the steps and descriptions described in relation to FIGS. 8-16 may be done in alternative orders or in parallel to further the purposes of this disclosure. For example, each of these steps may be performed in any order or in parallel or substantially simultaneously to reduce lag or increase the speed of the system or method.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for mixing models to optimize media placement, the method comprising:

receiving a user input of a plurality of combinations of decision variables, wherein each of the plurality of combinations is associated with a potential media placement slot;

identifying, for each of the plurality of combinations of decision variables, a plurality of natural language identifiers;

determining, for each of the plurality of combinations of decision variables, a first plurality of standardized identifiers corresponding to the plurality of natural language identifiers;

replacing, for each of the plurality of combinations of decision variables, the plurality of natural language identifiers with the first plurality of standardized identifiers;

retrieving a second plurality of the first plurality of standardized identifiers for a first subset of the plurality of combinations of decision variables;

applying the retrieved second plurality of the first plurality of standardized identifiers for the first subset to a first linear model that represents a first relationship between the plurality of combinations and associated reach metrics to generate a first reach metric associated with the first subset;

retrieving a third plurality of the first plurality of standardized identifiers for a second subset of the plurality of combinations of decision variables;

applying the retrieved third plurality of the first plurality of standardized identifiers for the second subset to a second non-linear model that represents a second relationship between the plurality of combinations and associated reach metrics to generate a second reach metric associated with the second subset;

comparing the first reach metric and the second reach metric;
determining, based on the comparison, that the first reach metric is greater than the second reach metric; and
storing, in a media placement database, an identifier of a media asset in a media placement slot associated with the plurality of combinations of decision variables in the first subset.

2. The method of claim 1, further comprising applying the retrieved first subset to the first linear model and applying the retrieved second subset to the second non-linear model for a threshold amount of time.

3. The method of claim 1, wherein the first reach metric is a first range, a first unique reach value, or a first impressions value and the second reach metric is a second range, a second unique reach value, or a second impressions value.

4. The method of claim 1, further comprising combining the first linear model and the second non-linear model.

5. The method of claim 1, wherein comparing the first reach metric and the second reach metric further comprises:
comparing an upper bound associated with the first reach metric to a lower bound associated with the second reach metric;
comparing a lower bound associated with the first reach metric to an upper bound associated with the second reach metric; and
based on the determination that the first reach metric is greater than the second reach metric, ending execution of the second non-linear model.

6. The method of claim 1, further comprising:
periodically transmitting the second reach metric from the second non-linear model to the first linear model; and
modifying the first linear model based on the second reach metric.

7. The method of claim 1, wherein the first reach metric is a first impressions value and the second reach metric is a second impressions value, and further comprising determining a first unique reach value based on the first reach metric, and a second unique reach value based on the second reach metric.

8. The method of claim 1, further comprising generating for display the plurality of combinations of decision variables in the first subset, wherein the plurality of combinations of decision variables includes combinations of times, lengths of media assets, times elapsed in media assets, audience demographics, and user equipment.

9. The method of claim 1, wherein the user input is a first user input and the plurality of combinations of decision variables is a first plurality of combinations, and further comprising:
receiving a second user input of a second plurality of combinations of decision variables;
determining that the first plurality of combinations is similar to the second plurality of combinations; and
modifying the first linear model based on the first reach metric.

10. The method of claim 1, further comprising storing, in a database, an association between the plurality of combinations and the first linear model.

11. A system for mixing models to optimize media placement, the system comprising control circuitry configured to:
receive a user input of a plurality of combinations of decision variables, wherein each of the plurality of combinations is associated with a potential media placement slot;
identify, for each of the plurality of combinations of decision variables, a plurality of natural language identifiers;
determine, for each of the plurality of combinations of decision variables, a first plurality of standardized identifiers corresponding to the plurality of natural language identifiers;
replace, for each of the plurality of combinations of decision variables, the plurality of natural language identifiers with the first plurality of standardized identifiers;
retrieve a second plurality of the first plurality of standardized identifiers for a first subset of the plurality of combinations of decision variables;
apply the retrieved second plurality of the first plurality of standardized identifiers for the first subset to a first linear model that represents a first relationship between the plurality of combinations and associated reach metrics to generate a first reach metric associated with the first subset;
retrieve a third plurality of the first plurality of standardized identifiers for a second subset of the plurality of combinations of decision variables;
apply the retrieved third plurality of the first plurality of standardized identifiers for the second subset to a second non-linear model that represents a second relationship between the plurality of combinations and associated reach metrics to generate a second reach metric associated with the second subset;
compare the first reach metric and the second reach metric;
determine, based on the comparison, that the first reach metric is greater than the second reach metric; and
store, using storage circuitry, in a media placement database, an identifier of a media asset in a media placement slot associated with the plurality of combinations of decision variables in the first subset.

12. The system of claim 11, wherein the control circuitry is further configured to apply the retrieved first subset to the first linear model and applying the retrieved second subset to the second non-linear model for a threshold amount of time.

13. The system of claim 11, wherein the first reach metric is a first range, a first unique reach value, or a first impressions value and the second reach metric is a second range, a second unique reach value, or a second impressions value.

14. The system of claim 11, wherein the control circuitry is further configured to combine the first linear model and the second non-linear model.

15. The system of claim 11, wherein the control circuitry configured to compare the first reach metric and the second reach metric is further configured to:
compare an upper bound associated with the first reach metric to a lower bound associated with the second reach metric;
compare a lower bound associated with the first reach metric to an upper bound associated with the second reach metric; and
based on the determination that the first reach metric is greater than the second reach metric, end execution of the second non-linear model.

16. The system of claim 11, wherein the control circuitry is further configured to:
periodically transmit the second reach metric from the second non-linear model to the first linear model; and
modify the first linear model based on the second reach metric.

17. The system of claim 11, wherein the first reach metric is a first impressions value and the second reach metric is a second impressions value, and wherein the control circuitry is further configured to determine a first unique reach value based on the first reach metric, and a second unique reach value based on the second reach metric.

18. The system of claim 11, wherein the control circuitry is further configured to generate for display the plurality of combinations of decision variables in the first subset, wherein the plurality of combinations of decision variables includes combinations of times, lengths of media assets, times elapsed in media assets, audience demographics, and user equipment.

19. The system of claim 11, wherein the user input is a first user input and the plurality of combinations of decision variables is a first plurality of combinations, and wherein the control circuitry is further configured to:
- receive a second user input of a second plurality of combinations of decision variables;
- determine that the first plurality of combinations is similar to the second plurality of combinations; and
- modify the first linear model based on the first reach metric.

20. The system of claim 11, wherein the control circuitry is further configured to store, using the storage circuitry, in a database, an association between the plurality of combinations and the first linear model.

* * * * *